United States Patent
Lebourg et al.

(10) Patent No.: US 7,370,105 B2
(45) Date of Patent: May 6, 2008

(54) QUALITY OF SERVICE CONTROL, PARTICULARLY FOR TELECOMMUNICATION

(75) Inventors: Isabelle Lebourg, Versailles (FR); Anne Laverriere, Paris (FR)

(73) Assignee: Bull S.A.S., Les Clayes-Sous-Bois (FR)

( * ) Notice: Subject to any disclaimer, the term of this patent is extended or adjusted under 35 U.S.C. 154(b) by 1074 days.

(21) Appl. No.: 09/862,343

(22) Filed: May 23, 2001

(65) Prior Publication Data

US 2002/0152297 A1    Oct. 17, 2002

(30) Foreign Application Priority Data

May 23, 2000    (FR) .................................. 00 06537

(51) Int. Cl.
  *G06F 15/173*    (2006.01)
(52) U.S. Cl. ..................................... 709/224
(58) Field of Classification Search ........ 709/223–224; 719/315, 316; 715/513
  See application file for complete search history.

(56) References Cited

U.S. PATENT DOCUMENTS 5,903,731 A * 5/1999 Vincent et al. ............. 709/226

(Continued)

FOREIGN PATENT DOCUMENTS

WO    WO 98 42102 A    9/1998

(Continued)

OTHER PUBLICATIONS

Michael Langer et al: "customer Service Management: towards a Management Information Base for an IP Connectivity Service" Proceedings IEEE Int'l Symp. on Computers and Communications, Jul. 6-8, 1999, pp. 149-155, XP002162704, Red Sea, Egypt, Paragraph 01.1, paragraph 02.2.

(Continued)

*Primary Examiner*—Andrew Caldwell
*Assistant Examiner*—Douglas Blair
(74) *Attorney, Agent, or Firm*—Miles & Stockbridge P.C.; Edward J. Kondracki

(57) ABSTRACT

The subject of the invention is a method for controlling the quality of a service (85) that includes at least one technical component (86) defined according to one of several possible technologies, the quality of service being defined by a technical contract (100) between the provider of the service and a customer and the contract (100) including quality criteria (101) associated with thresholds (102) and related to said technology. The method comprises producing: a description (S1, S2, S3), in a modeling language in object-oriented technology (UML, XML) and independent of said technologies, of the structure of a service model (80), the structure of a contract model (90) and the structure of collection tool model (110); constructing (S4, S5, S6) a service model (80), a contract model (90) and at least one collection tool model (110) from the respective descriptions of said structures; constructing (S7-S9) the service (85), the contract (100) and at least one collection tool (120) from the respective models (80, 90, 110); collecting (S10) quality of service indicators (103) using at least said collection tool (120); and comparing (S11) the quality indicators (103) with the thresholds (102) defined in the contract (100).

37 Claims, 8 Drawing Sheets

U.S. PATENT DOCUMENTS

| | | | | |
|---|---|---|---|---|
| 6,055,243 | A * | 4/2000 | Vincent et al. | 370/466 |
| 6,269,401 | B1 * | 7/2001 | Fletcher et al. | 709/224 |
| 6,304,892 | B1 * | 10/2001 | Bhoj et al. | 709/202 |
| 6,321,264 | B1 * | 11/2001 | Fletcher et al. | 709/224 |
| 6,335,927 | B1 * | 1/2002 | Elliott et al. | 370/352 |
| 6,466,973 | B2 * | 10/2002 | Jaffe | 709/223 |
| 6,687,747 | B1 * | 2/2004 | Huang et al. | 709/223 |
| 6,701,342 | B1 * | 3/2004 | Bartz et al. | 709/200 |
| 6,804,717 | B1 * | 10/2004 | Bakshi et al. | 709/225 |
| 6,834,298 | B1 | 12/2004 | Singer et al. | |
| 6,959,335 | B1 * | 10/2005 | Hayball et al. | 709/227 |
| 7,039,695 | B1 * | 5/2006 | DeLuca et al. | 709/223 |
| 7,260,621 | B1 * | 8/2007 | Lavian et al. | 709/223 |
| 7,315,826 | B1 * | 1/2008 | Guheen et al. | 705/7 |
| 2002/0026503 | A1 | 2/2002 | Bendinelli et al. | |
| 2002/0032783 | A1 | 3/2002 | Tuatini | |

FOREIGN PATENT DOCUMENTS

| | | |
|---|---|---|
| WO | WO 01/14962 A1 | 3/2001 |
| WO | WO 01/50701 A2 | 7/2001 |

OTHER PUBLICATIONS

Loyall, J.P. et al.: "Specifying and Measuring Quality of Service in Distributed Object Systems" Proceedings International Symp. on Object-Oriented Real-Time Distributed Computing, 1998, XP000961597, Entire Document.

Koji Hino et al: "To Be In Object Oriented Telecommunications Services Testbed System" IEICE Transactions on Communications, JP, Institute of Electronics Information and Comm. Eng., Tokyo, vol. E77-B, No. 11, Nov. 1, 1994, pp. 1332-1341, XP000504580, issn: 0916-8516.

* cited by examiner

QUALITY OF SERVICE CONTROL, PARTICULARLY FOR TELECOMMUNICATION

TECHNICAL FIELD

The invention relates to a method for controlling the quality of at least one service provided to a customer. It concerns any service having at least one technical component defined according to one of several possible technologies, the quality of service being defined by a technical contract between the provider of the service and a customer. Such a contract includes quality criteria associated with thresholds and related to the technology of the service. The invention will be illustrated by a typical and particularly restrictive example related to a service provided by a telecommunications operator to a customer, which can be a natural person or a legal entity. The description of this service and of the associated contract is known to be complex and must be adapted to the various technologies available on the market. The invention also relates to respective generic service, contract and data collection structures that make it possible to implement the method for controlling the quality of the service in accordance with the contract defined between the provider of the service and a customer.

As a result of the three modular structures used by the quality of service control method, the invention can simply be implemented by a service structure for service monitoring or control. Service monitoring is performed in order to learn the service or services provided and their conditions. The invention also relates to a service monitoring method.

In addition, particularly when a service has many quality criteria and requires continuous monitoring like a telecommunication service, the control method requires highly reactive and high-performance means, like those used to manage an information system. The invention also relates to a management system of an information system, used to implement the method for controlling the quality of a service defined by a contract between the provider of the service and a customer.

THE PRIOR ART

The primary purpose of quality of service control is to verify that the criteria defined in a contract linked to the service provided are satisfied. Its secondary purpose is to inform the provider and the customer when at least one of the criteria is not being met, and to offer the provider and the customer information in the form of reports. The reports can make it possible to correct the service in order to comply with the contract. The correction can be technical or contractual, for example revising the unmet criteria. The reports can also be used to bill the client in accordance with the quality of service that has been provided.

The Telemanagement Forum classifies the management functions of telecommunication operators into three areas, respectively related to Service Fulfillment, Service Assurance and Billing. Service fulfillment can include an order for the service by the client, the design of the communication infrastructure and the configuration of the network equipment, and the activation of the service. The assurance of a service as sold includes communication infrastructure monitoring and quality of service control. Billing for a service can be done in accordance with the quality of the service rendered by the operator.

In the telecommunications field, a service is an end-to-end connection (from end point to end point) based on a given technology. Currently, a telecommunication technology can be chosen from, for example, Frame Relay technology, Asynchronous Transfer Mode technology, known by the abbreviation ATM, and Internet Protocol (IP) technology. The quality of the service is defined by a contract, known by the abbreviation SLA (Service Level Agreement), constituted by a set of quality of service criteria called SLA criteria. The SLA criteria are based on quality of service indicators, normally called QoS (Quality of Service) indicators. During the definition of the contract, the service provider and the customer agree to define a threshold for each SLA criterion. Quality of service control comprises the measurement of the quality and the monitoring of the contract. The monitoring of the contract includes the comparison of the measurements relative to the service with the threshold values defined in the contract. The threshold values relative to the SLA criteria of a contract define a contract level. In other words, a contract level is a contract that defines default threshold values for the SLA criteria that are at least partially different from the values defined for the same thresholds of another contract level.

Controlling the quality of a telecommunication service requires a lot of data in a highly diversified technical field in which it is particularly necessary to accommodate the various available telecommunication technologies, the various modes of implementation offered by network equipment manufacturers, and the various possible data collection means required for the monitoring of the contract. Each technology, each communication infrastructure and each network equipment configuration is defined by many characteristics. The result is a high-level and often complex combination of data, given the links that can exist between them and how fast they change. Added to this data is various data linked to the collection tools. For example, throughputs, times and geographical zones must be taken into account. Furthermore, the operator must be quickly notified of a failure and must be sufficiently informed as to the nature and the characteristics of the failure to be able to perform a rapid diagnosis that makes it possible to offer an effective correction of the service provided. Hence, it is understood that controlling the quality of such a service poses many problems.

There are four problems that are particularly important. The first problem is to ensure exhaustive control of the quality of the service. This exhaustiveness must be applied to all the quality of service criteria of the contract and all their characteristics, to the verification of the criteria relative to the associated thresholds, and to the evaluation of the failures detected during the verification. The exhaustion must also be able to change or move for a time period as short as possible in this field, which is currently expanding rapidly. The second problem is to perform a generic control of the quality of a service. A control that is specially adapted to one or several types of telecommunication technology, network equipment, and data collection tools can quickly become obsolete in this rapidly changing and varied field. A control requiring a heavy human and financial investment can only have continuity if it is generic enough to be adapted very quickly and cheaply to this type of change. The third problem is to offer synthetic control. Given the enormous volume of data to be processed, the many quality criteria to be measured, and the failures that can occur, non-synthetic control would have the drawback of being difficult, and sometimes even impossible, to perform if several failures occur at approximately the same time. The fourth important problem resides in easy access to the data to be processed and the data resulting from the quality control. The monitoring of the contract requires rapid and certain diagnosis of the possible causes of a quality failure in order to effectively fix it as fast as possible. It is therefore necessary to be able to easily access the data involved in a diagnosis.

Several known management systems have powerful hardware and software means for processing a high volume of data for controlling the quality of service of a service that is as rich and complex as a telecommunication service. One example that will be used to illustrate the invention is the Applicant's product known by the name OpenMaster®. This is a software product constituting a management system for systems, networks and applications. The large-scale management systems known to date can handle the field called Service Assurance by the Telemanagement Forum. However, the current management systems can only perform basic data processing for monitoring the quality of service. In other words, none of them can solve at least one of the four problems presented above.

Management for controlling the quality of a service also poses its own specific problem. The goal of management product vendors and software product integrators is to sell service providers, such as telecommunication operators, a control product that is suitable for each of the operators. Such a product must therefore be generic enough to be easily and cheaply adapted to various current and future operators. Furthermore, integrators want to be able to easily obtain the basic information on the operation of a management product for controlling the quality of a service.

SUMMARY OF THE INVENTION

A first object of the invention is to have a method that is quickly and reliably adaptable to current and future technologies for controlling the quality of at least one service. In the case, for example, of a service provided by a telecommunication operator, this object is achieved if the method is independent of the technologies used by the telecommunication operators and network equipment manufacturers and by the control data collection means.

A second object is to be able to easily perform an exhaustive control of the quality of a service that is rich in data and in complexity.

A third object is to offer a synthetic description of the data in order to facilitate both the processing of the data for the purpose of implementing the quality of service control method, and the diagnosis of the failures discovered. This ease of operation can give the provider the advantage of being able to effectively correct failures very quickly, and consequently, to lose less money while providing its clients with better satisfaction.

A fourth object is to be able to adapt the data that are necessary for quality of service control to any service provider, while maintaining the same data structure. This adaptation has the advantage of being able to cheaply and rapidly furnish each provider with a management tool adapted to his needs.

A fifth object is to guide software integrators by giving them a precise structure for the data required for quality of service control. The integrators can thus simply and reliably adapt the data required by each provider while incurring a minimal cost.

A sixth object is to be able to simply perform a service monitoring without measuring the quality of the service, in order to learn the service or services provided and their conditions independent of the technologies related to the service.

The first subject of the invention is a method for monitoring a service that includes at least one technical component defined according to one of several possible technologies, characterized in that it comprises: a description, produced in a modeling language in object-oriented technology and independent of said technologies, of the structure of a service model; the construction of a service model from the description of said structure; the construction of the service from the service model; and the monitoring of the service thus constructed.

The second subject of the invention is a method for controlling the quality of a service that includes at least one technical component defined according to one of several possible technologies, the quality of service being defined by a technical contract between the provider of the service and a customer and the contract including quality criteria associated with thresholds and related to said technology, the method being characterized in that it comprises: a description, produced in a modeling language in object-oriented technology and independent of said technologies, of the structure of a service model, the structure of a contract model, and the structure of a collection tool model; the construction of a service model, a contract model, and at least one collection tool model from the respective descriptions of said structures; the construction of the service, the contract, and at least one collection tool from the respective models; the collection of quality of service indicators using at least said tool; and the comparison of the quality indicators with the thresholds defined in the contract.

The third subject of the invention is a structure of a service model for controlling the quality of service of a service that includes at least one technical component defined according to one of several possible technologies, the quality of service being defined by a technical contract between the provider of the service and a customer and the contract including criteria associated with thresholds and related to said technology, characterized in that it is implemented according to the service monitoring method or the quality of service control method defined above.

The fourth subject of the invention is a structure of a contract model for controlling the quality of service of a service that includes at least one technical component defined according to one of several possible technologies, the quality of service being defined by a technical contract between the provider of the service and a customer and the contract including criteria associated with thresholds and related to said technology, characterized in that it is implemented according to the quality of service control method defined above.

The fifth subject of the invention is a structure of at least one quality indicator collection tool model for controlling the quality of service of a service that includes at least one technical component defined according to one of several possible technologies, the quality of service being defined by a technical contract between a provider of a service and a customer and the contract including criteria associated with thresholds and related to said technology, characterized in that it is implemented according to the quality of service control method defined above.

The sixth subject of the invention is a system for managing at least one resource using a service that includes at least one technical component defined according to one of several possible technologies, the management system including quality indicators used to control the quality of service defined by a technical contract between the provider of the service and a customer and the contract including criteria associated with thresholds and related to said technology, characterized in that it implements the service monitoring method or the quality of service control method defined above.

The seventh subject of the invention is a computer program loadable into the internal memory of a computer system, characterized in that it comprises code segments for implementing the two methods defined above.

The eighth corollary subject of the invention is a computer program recording medium, characterized in that it comprises a program readable by a machine of an information system and/or in a management system for controlling the execution of the two methods defined above.

PRESENTATION OF THE DRAWINGS

Figure 4:
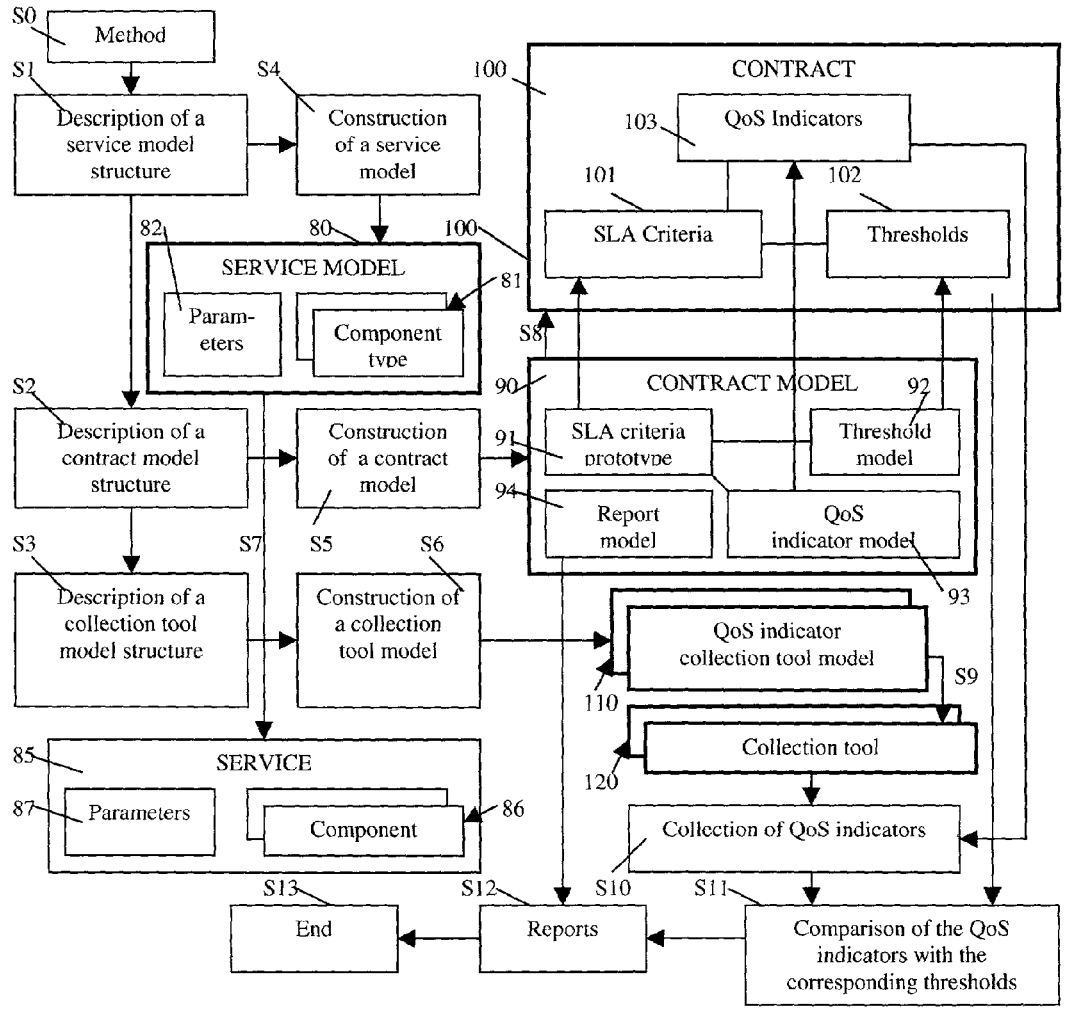
FIG. 4 is a diagram illustrating the steps of an exemplary method for the control, by the management system represented in FIGS. 1 and 2, of the quality of a telecommunication service.
Figure 9:
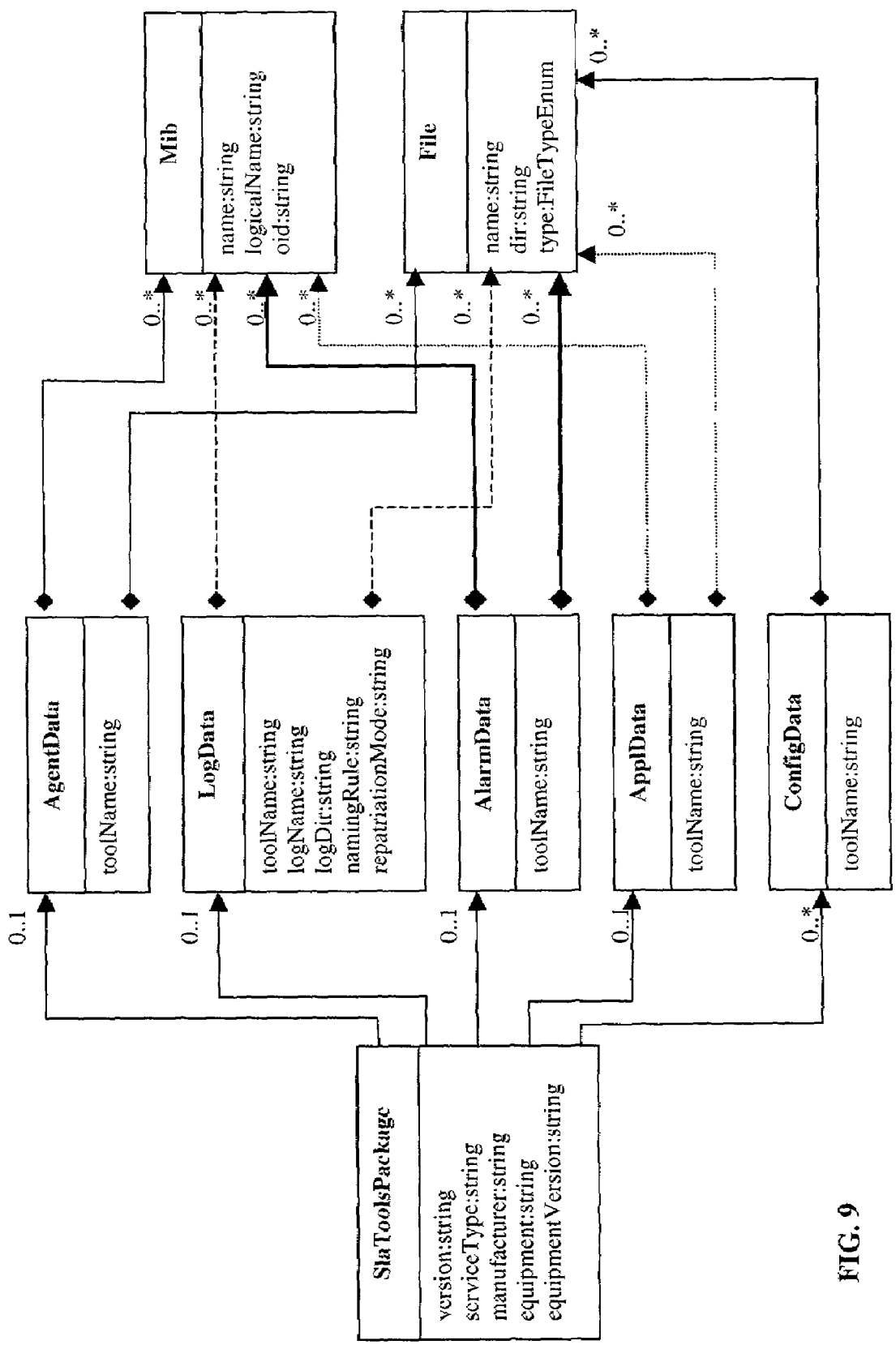

And FIG. 9 illustrates an exemplary structure of an SLA tool description model used by the method of the invention represented in FIG. 4.

DETAILED DESCRIPTION OF THE INVENTION

Figure 1:
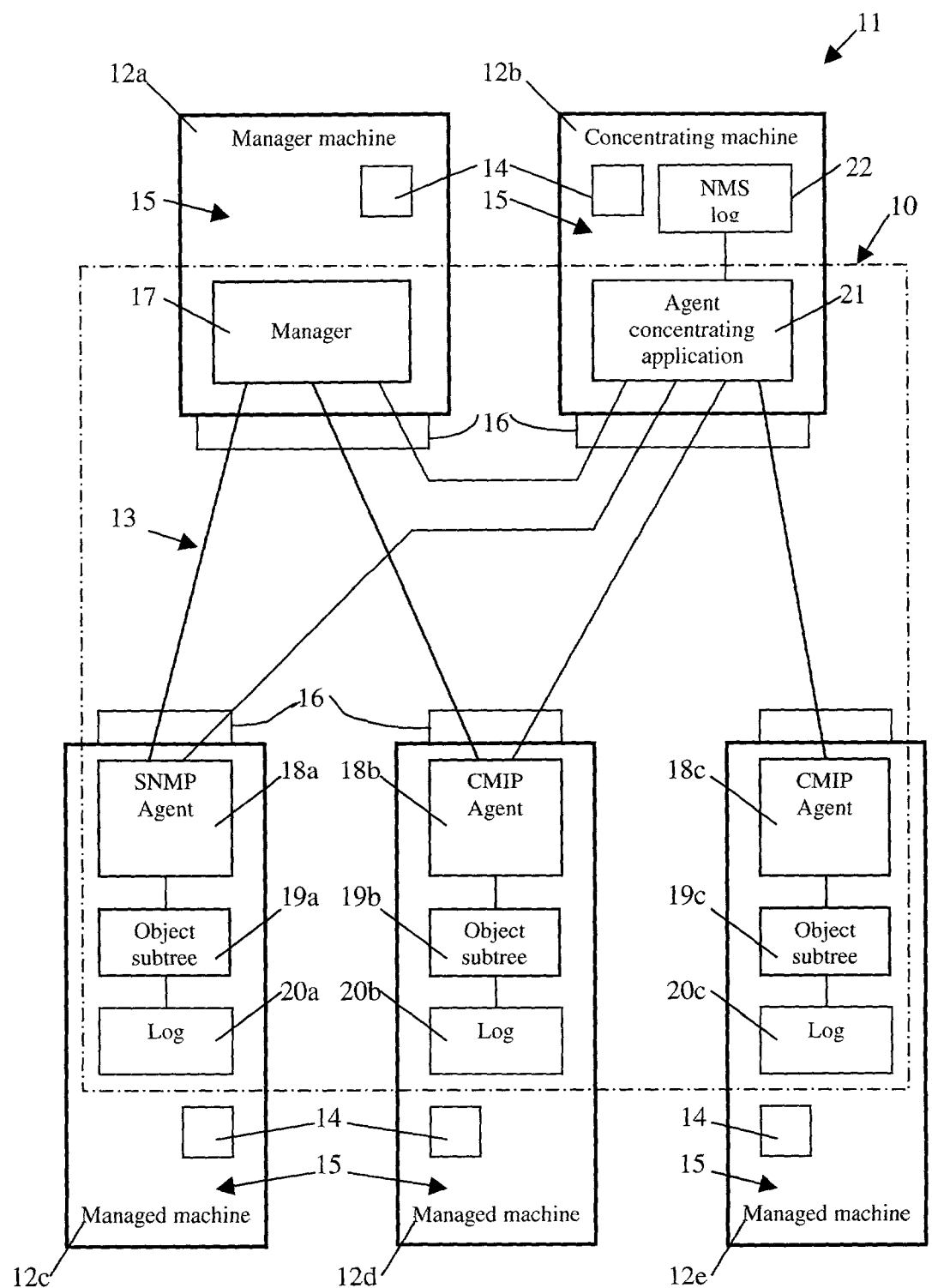
FIG. 1 is a block diagram of an exemplary system for managing at least one resource, in this case an information system, the management system implementing a method for controlling the quality of services provided by a telecommunication operator to its customers under the conditions defined in the respective contracts.

FIG. 1 represents a management system 10 of an information system 11. The following example relates to the management and security system known by the Applicant's registered trademark OpenMaster. Its design is in compliance with the ISO standards for systems and network management. Under these conditions, the terms used will be in compliance with this standard, including the abbreviations and acronyms. Furthermore, the French verbs "administrer" and "gérer" and their derivatives used herein have both been translated into the English verb "manage" and its derivatives. One skilled in the art is quite familiar with these terms. Given their informative content, only the elements required to understand the invention will be given here.

The information system illustrated 11 is distributed and is composed of machines 12, in this case five machines 12a-12e, organized into one or more networks 13 corresponding to one or more of any protocols, preferably dedicated to management and standardized. In the example illustrated, the network 13 uses the protocol SNMP (Simple Network Management Protocol) and the protocol CMIP (Common Management Information Protocol) based on the ISO standard defining services for the transfer of management information, called CMIS (Common Management Information Services). Of course, other protocols could be used, as well as the internet network of the Web.

A machine is a very large conceptual unit that includes both hardware and software, which can be the means involved in executing a given application, means for executing a given function, a computer, as well as an information system in a cascaded systems architecture. The machines 12 can therefore be very diverse, such as workstations, servers, routers, specialized machines and gateways between networks. The example chosen assumes that the machines illustrated are dedicated to monitoring the quality of telecommunication services and specifically incorporate routers.

The information system 11 is ordinarily a system comprising several processors 14, one processor 14 for example being illustrated in each machine 12, storage means 15 for containing the software and the data of the system, and input-output means 16 used for communication between machines via the network 13, as well as for one or more external communications, for example for printing, faxing, etc. Such a system can, for example, manage data remotely, distribute data, remotely control the execution of programs in specialized machines, locally share physical or logical resources, and communicate. More generally, the system 11 is composed of real or virtual hardware and/or software resources, such as machines, printers, virtual circuits, networks and applications. The management system 10 uses at least one of these resources in accordance with an object-oriented technology, well known to one skilled in the art.

The management system 10 chosen has an architecture of the client-server type. The server part manages and the client part contains the resource or resources to be managed. In the example illustrated, the server part comprises a manager 17 included in the machine 12a, called a manager machine, while the client part comprises an agent concentrating machine 12b, called a concentrating machine, and three agents 18 (18a-18c) that allow access to the resources to be managed contained in the respective machines 12c-12e, called managed machines. The managed resources in the machines 12c-12e are identified in the form of objects organized into respective subtrees 19 (19a-19c). In the managed machines 12c-12e, the resources 19a-19c include respective logs 20 (20a-20c) containing quality of service indicators called QoS indicators. The concentrating machine 12b chosen contains a concentrating application 21 and a log 22. The concentrating application 21 is a network management system type of application, better known by the name NMS (Network Management System). It is responsible for concentrating, in the log 22, also called an NMS log, the data contained in the local logs 20 relative to the monitoring of the quality of the telecommunication services used in the managed machines 12c-12e. Consequently, the concentrating application 21, like the manager 17, is linked to the agents 18 (18a-18c) via the network 13. It is also linked via the network 13 to the manager 17. Thus, to obtain the desired data, the manager 17 can access the agents 18 directly and/or indirectly through the concentrating machine 12b. For example, the manager 17 can obtain data directly from the managed machines 12c and 12d and indirectly from all three managed machines 12c-12e via the concentrating machine 12b. To facilitate the description, it will hereinafter be assumed that the manager 17 uses the concentrating machine 12b to obtain all of the data related to the quality control of telecommunication services. The concentrating machine 12b therefore behaves like an agent 18 in relation to the manager 17, for all of this data.

Generally, the manager 17 analyzes and acts on the environment to be managed. It responds to requests from users by sending them to the managed resource in question. An agent 18, like the concentrating machine 12b, is a reactive interface, assigned to a given communication protocol, with at least one manager 17 via the associated network 13. It waits for and processes the requests that the manager sends it. It maintains and updates the data contained in the corresponding subtree 19 of the managed machine 12. Conversely, a resource can send a response to a request from the manager. This response is transmitted to the manager by an agent. In addition, a managed object in a resource can send notifications to an agent for the manager. According to the ISO standard, a notification is a message that is not solicited by a manager. The standard defines an event as a type of notification, and an alarm as a type of event. In order to simplify the description and the drawings, the three managed machines 12c-12e have only been provided with three respective agents 18a-18c. According to a common and advantageous option of the management system 10, a manager 17 also manages the corresponding manager machine 12, or more generally, manages all or some of the manager machines that can exist in the management system. This can be done in a way similar to that illustrated, more or less adapted to this option. The example illustrated offers the dual advantage of facilitating the reading of the drawings while allowing one skilled in the art to generalize the system described and illustrated.

Figure 2:
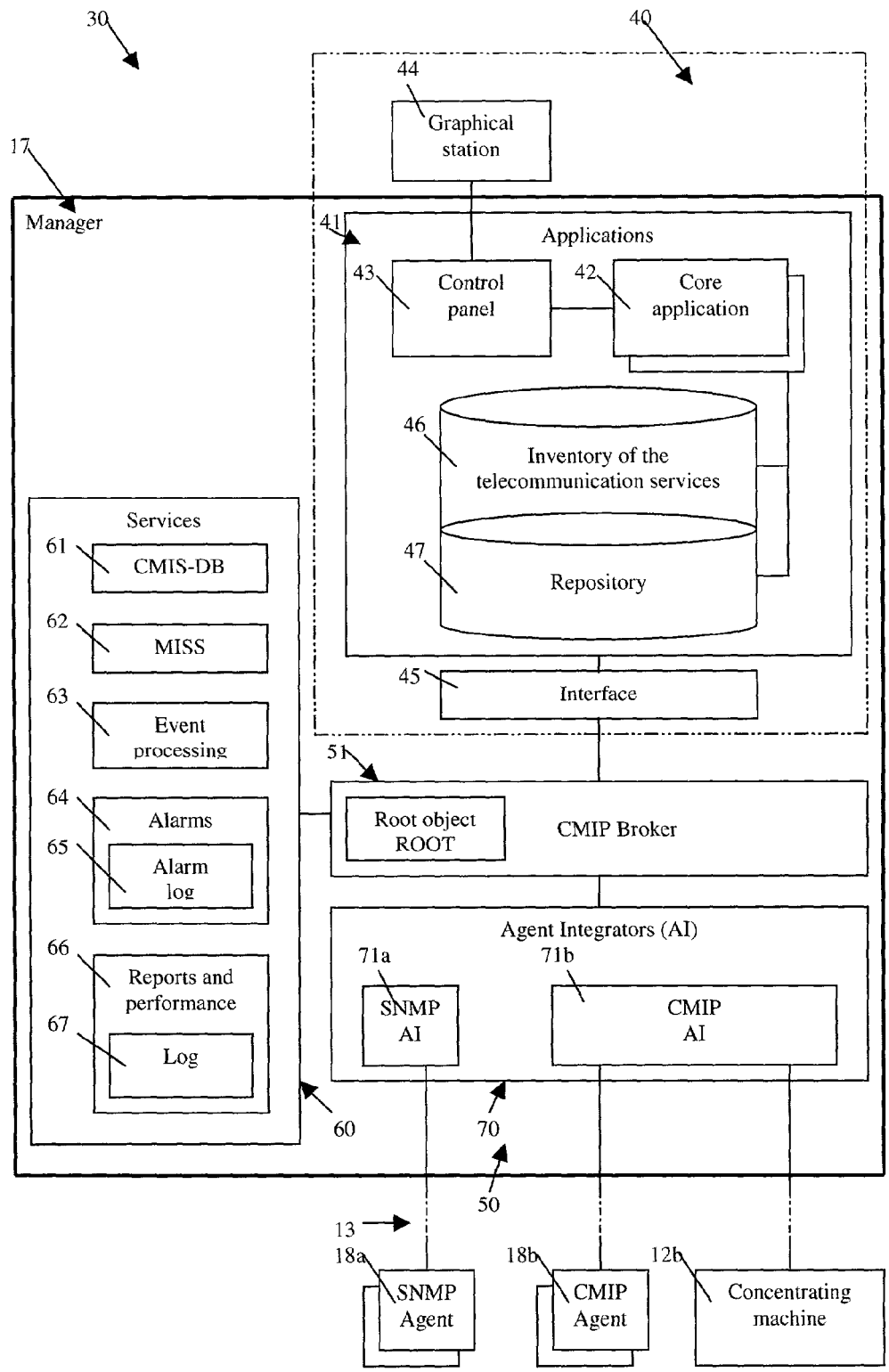
FIG. 2 is a detailed block diagram of an exemplary structure of a management platform present in the manager of the management system represented in FIG. 1 and also illustrates, in the form of a block diagram, agents serving as interfaces with the resources of the information system.

FIG. 2 illustrates the structure of a management platform 30 of the management system 10. The platform 30 is contained in the manager machine 12a and thus corresponds to the manager 17. However, in a management system with several managers, the platform 30 could be distributed among all or some of them. The platform 30 is composed of two systems 40 and 50. The system 40 contains a block 41 containing a set of applications 42 connected to a control panel 43. The applications can be written in one or more languages, the Java® language in the Applicant's OpenMaster® platform. The control panel 43 is conventional and includes a graphical part and a request launcher. A graphical station 44, outside the platform 30, is connected to the control panel 43 in order to display the applications 42, launch the requests and display the results contained in the responses. It allows a user to connect to the machine 12a in order to start and stop his own copies of the applications 42 as desired. The system 40 includes interface means 45 and, in the block 41, a database 46 constituting an inventory of the telecommunication services used in the information system 10 and a repository 47 also constituting a database. The inventory 46 and the repository 47 are linked to an application 42 dedicated to controlling the quality of the telecommunication services contained in the inventory 46. The system 40 can form an autonomous unit delimited by a broken line and constituting a management station.

In the case where the system 40 constitutes a management station, the system 50 forms a management server. The server 50 uses only one given protocol, in this case the protocol CMIP. It comprises three functional blocks: a communication block 51, also called a CMIP broker or CMIS dispatcher; a CMIS services block 60; and an interface block 70 that interfaces the platform 30 with the concentrating machine 12b and the agents 18a and 18b of the resources managed directly by the platform. The broker 51 is connected to the interface means 45 of the station 40, as well as to the blocks 60 and 70 of the server 50, in order to process the requests and their potential responses, as well as the notifications issued by the agents 18a and 18b and by the concentrating machine 12b. The broker 51 contains the root object ROOT to which all the objects managed by the platform 30 are attached. The block 60 contains all of the services common to the applications 42, including: a CMIS database CMIS-DB 61; a management information schema service MISS 62 containing the schemas, also called the classes, of the objects managed by the platform; an event processing service 63; an alarm service 64 incorporating an alarm log 65; and a report and performance service incorporating a log 67 and used by the performance applications 42, and more particularly by the control application 42, to evaluate the performance of the contract and produce reports. The block 70 illustrated includes two interfaces 71a and 71b which, in the example chosen, are respectively linked via the network 13 to the agent 18a and to the concentrating machine 12b and the agent 18b, and are ordinarily called agent integrators or AI. Several sets of agents 18a and 18b outside the platform 30 are illustrated in order to indicate that in practice, all or some of the agents can manage distributed objects in the information system and can be located in several, machines 12 of the information system 11, a machine being able to incorporate several agents using different protocols.

Figure 3:
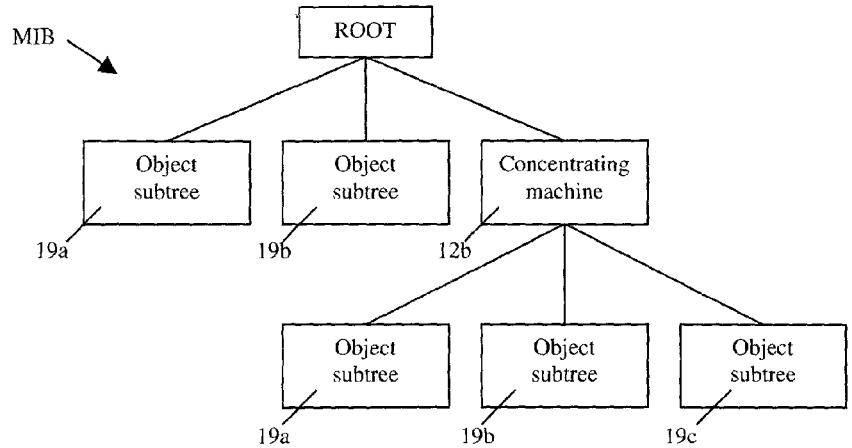
FIG. 3 is a partial and highly schematic view of a tree representing a Management Information Base, called MIB, related to the objects managed by the manager represented in FIGS. 1 and 2.

FIG. 3 illustrates, in partial and highly schematic fashion, an exemplary structure of a base MIB of objects that are managed by the platform 30 constituting the manager 17 of the management system 10 and that represent at least one resource of the information system 11. The managed resources are converted into object classes organized hierarchically in a management information base MIB. This base is not a data base per se, but is similar to a catalogue of characteristics since it contains the description and the contents of all the classes managed by the management system 10. A class is defined by characteristics called attributes, such as a name of a component of the system and a print status. An object of a class is an instance of the class. The organization of the classes in the chosen example of the management system 10 is hierarchical. There is a distinction between the class tree, a class being defined as subordinate to one or more mother classes, and the instance tree, an instance being attached to one or more mother instances. The class tree is contained in the service MISS 62, while the instance tree is the tree corresponding to the base MIB, as represented in FIG. 3. In the base MIB, the objects are divided into managed object classes, called MOCs. A managed object is an abstract view, defined for the purpose of managing a logical or physical resource of a system. Each class MOC represents a given type of said means of the system 11. One or more managed object instances, called MOIs and representing current occurrences of said means, can be attached to each class.

All the objects of the base MIB in FIG. 3 are located under the root ROOT and are divided into MIBlets, hereinafter called MIB modules. The root ROOT is contained in the broker 51 and the roots of the MIB modules are called rootlets. FIG. 3 illustrates two MIB modules representing the two machines 12c and 12d managed by the manager 17 and corresponding to the two respective subtrees 19a and 19b, and a MIB module representing the concentrating machine 12b. We have already seen that the subtrees 19a and 19b include the respective logs 20a and 20b. The concentrating machine 12b, previously considered an agent, is a rootlet to which the respective subtrees 19a-19c are attached as sub-modules.

However, the concentrating machine 12b cannot be an agent. In this case, the concentrating machine and the three sub-modules 19a-19c would not appear in the base MIB of FIG. 3. The only function of the concentrating machine 12b would then be to collect the data in the logs 20a-c of the three managed machines 12c-12e. The manager 17 would then only need to ask the concentrating machine to transmit it the collected data. This case is simpler in practice, and corresponds to the one chosen to implement the quality of service control method according to the invention. FIG. 3 offers the advantage of illustrating a possible variant.

Also in practice, a rootlet (not illustrated) is also attached under the root ROOT of the base MIB for each service of the block 60. In this bloc, the service CMIS-DB 61 provides a database for the managed objects MOI, dedicated to their persistence once the manager is shut down. It supports all the classes MOC of the CMIS services that are stored locally in a database. Furthermore, it provides a set of basic services or functions, also called primitives, available for all the applications 42. These functions are well adapted to the hierarchical structure of the base MIB. They specifically include the functions M-GET for reading one or more instances, M-SET for updating one or more instances, M-CREATE for creating an instance, M-ACTION for activating a specific operation on one or more instances, and M-EVENT for sending an event.

The management system 10 serves as an exemplary support for implementing the method for controlling the quality of a service provided by a telecommunications operator to a customer under the conditions defined in a contract and as defined in the introduction of the present application. A customer can be any person or company, and the latter can be another operator. We have seen in the introduction that a conventional management system 10 provides the basic functions for maintaining the service. The management system 10 illustrated, enriched by the invention, offers the telecommunication service provider the advantage of obtaining, from appropriate models, the services to be monitored, the quality of service contracts entered into between it and its customers on these services, and the description of the way of controlling the quality of service. It also makes it possible to generate monitoring reports on the services provided, so as to offer the customers a limited and secure view.

FIG. 4 is a diagram illustrating an exemplary structure of the method for controlling, by means of the management system 10, the quality of a telecommunication service used in the information system 1. The telecommunication services offered by the operator are contained in the inventory 46 (FIG. 2), in which the services, the customers and the corresponding contracts are identified. The method illustrated in FIG. 4 for controlling the quality of a service, a service being defined according to one of several possible technologies, begins with step S0 and includes three description steps S1, S2 and S3. These three steps describe, in a modeling language in object-oriented technology and independent of the possible technologies for implementing the service, three respective structures, i.e., a service model structure, a contract model structure and a collection tool model structure.

The method of FIG. 4 continues with three respective steps S4, S5 and S6 for constructing a service model 80 related to a given technology, a contract model 90 related to this technology and used to define the specific contract 100 between the provider and a customer, and at least one collection tool model 110, from the three respective generic description steps S1, S2 and S3. Thus, a service provider can, based on the three structures described above, create as many service models, SLA models and SLA tool description models as desired. All of these models conform to the structures defined in their respective grammars. All of the models 80, 90 and 110 are contained in the repository 47 (FIG. 2).

More precisely, the structure of a service model is described in generic form using a service model grammar. The description is generic in the sense that it is independent of the technology and the communication infrastructure. The description of a service model structure makes it possible to define, during step S4, at least one service model 80 that conforms to the generic service model grammar, no matter what the technology involved. In the example illustrated, a service model 80 includes at least a component type model 81 and a parameter model 82. The service models 80 enrich the repository 47 of the quality control method with data that makes it possible to describe the structure of a service to be monitored.

Likewise, the structure of a contract model, also called an SLA model, is described in generic form using an SLA model grammar. The contract model structure makes it possible to define, during step S5, at least one contract model 90, also called an SLA model. Each SLA criterion that composes a contract and is defined in the structure in a form that is generic, i.e. independent of the technology, is called in the SLA model 90 an SLA criteria prototype 91. In an SLA model 90, each prototype 91 is linked to at least one threshold model 92 and to only one QoS indicator model 93. The SLA model can optionally also include, as illustrated, at least one model 94 of reports to be generated. An SLA model 90 created during step S5 therefore conforms to the generic grammar of the SLA model structure, no matter what the technology involved in the SLA model. The SLA models 90 enrich the repository 47 of the quality control method for different technologies, depending on the provider's needs.

Again likewise, the structure of a data collection tool model that can be used to verify the SLA criteria is described in generic form using an SLA tool description grammar. In this case, the generic description indicates that it is independent of the technologies used by the operators and the equipment manufacturers. The collection tool model structure that is described using the SLA tool description grammar makes it possible to define, during step S6, at least one SLA tool model 110. Thus, the creation of an SLA tool model 110 conforms to the generic grammar, no matter what the technology, the equipment, and the SLA model in question. The SLA tool models 110 enrich the repository 47 of the quality control process with data that makes it possible to automatically configure a management product so as to implement quality control on the services.

It is noted that an SLA tool model 110 is based on the infrastructure of a service defined for a given technology with specific component types. The infrastructure of this service is represented in the form of a service model that depends on the types of equipment that constitute its infrastructure. Thus, an SLA tool model 110 is totally dependent on an SLA model 90 and on a service model 80. Consequently, an SLA tool model 110 can only be installed if the contract model 90 and the service model 80 to which it relates have already been installed in the management system.

In summary, the invention offers three grammars for describing the three structures during steps S1, S2 and S3 of the method, i.e.:

- a service model grammar for describing the structure of a model of a service to be provided, which in the telecommunications field is an end-to-end connection using a given technology and types of equipment furnished by different manufacturers. This grammar can, for example, define types of end points at the two ends of the connection, and parameters, including traffic parameters;
- an SLA model grammar for describing the structure of a model of a contract entered into between a customer and a telecommunications operator, the description involving a set of SLA criteria for the contract and optionally, a set of models of reports to be generated; and
- an SLA tool description grammar for describing a model for configuring the tools that can be used to verify compliance with the contract. These tools can be indicator collection tools or other tools involved in the quality control method. The description of the configuration of these tools must make it possible to pre-configure these tools automatically with the configuration elements they need during their execution.

These three grammars result from a choice of data to be processed. The description of the structure of these grammars is written in Unified Modeling Language UML, currently well adapted to the description of objects in object-oriented technology. The three grammars specified in UML are implemented in XML language in the form of three files. The XML language (eXtensible Markup Language) is a language for describing and exchanging structured documents. It makes it possible to describe the logical structure of documents using a system of flags that make it possible to mark the elements that compose the structure, and the relations between these elements. The XML language distinguishes between two classes of documents: well-formed documents and valid documents. A document is said to be well formed when it obeys the syntactic rules of the XML language. It can then be successfully processed by an appropriate processor, and particularly by an XML parser. A document is said to be valid when it is well-formed and when it also obeys a type of structure specifically defined in a grammar called DTD (Document Type Definition).

The quality of service control method that is represented in FIG. 4 continues with three steps S7, S8 and S9, illustrated by arrows and beginning with the respective models 80, 90 and 110. Steps S7, S8 and S9 specifically relate to the construction of the desired service 85, the desired contract 100 and at least one collection tool 120 required for the quality control defined by the contract 100. In other words, steps S7, S8 and S9 make it possible to construct several services 85, several contracts 100 and several collection tools 120 from the respective models 80, 90 and 110. The service 85 contains components 86 and optionally, parameters 87, which can for example include traffic parameters in the case of a telecommunication service. The components 86 are derived from the component type models 81 of the service model 80, while the parameters 87 are derived from the parameter model 82 of the model 80. The contract 100 specifically defines: the SLA criteria 101, constructed from respective SLA criteria prototypes 91; the threshold values 102 derived from at least one threshold model 92; and the QoS indicators 103 related to the SLA criteria 101 and constructed from respective QoS indicator models 93. Likewise, the collection tool models 110 are used to defined tools 120 for collecting the QoS indicators required for the quality control of the service defined by the contract 100.

The method for controlling the quality of the service thus defined also includes: a step S10 for collecting QoS indicators in accordance with the QoS indicators 103 of the contact 100 using at least one collection tool 120; a step S11 for comparing the QoS indicators with the corresponding thresholds 102 defined in the contract 100; and, depending on the option chosen, a step S12 for reports, in this case drawn up in accordance with the report models 94 that exist in the contract model 90 and are also contained in the contract 100, not illustrated in the contract 100 for purposes of clarity in the drawings. The method illustrated ends with step S13.

Figure 5:
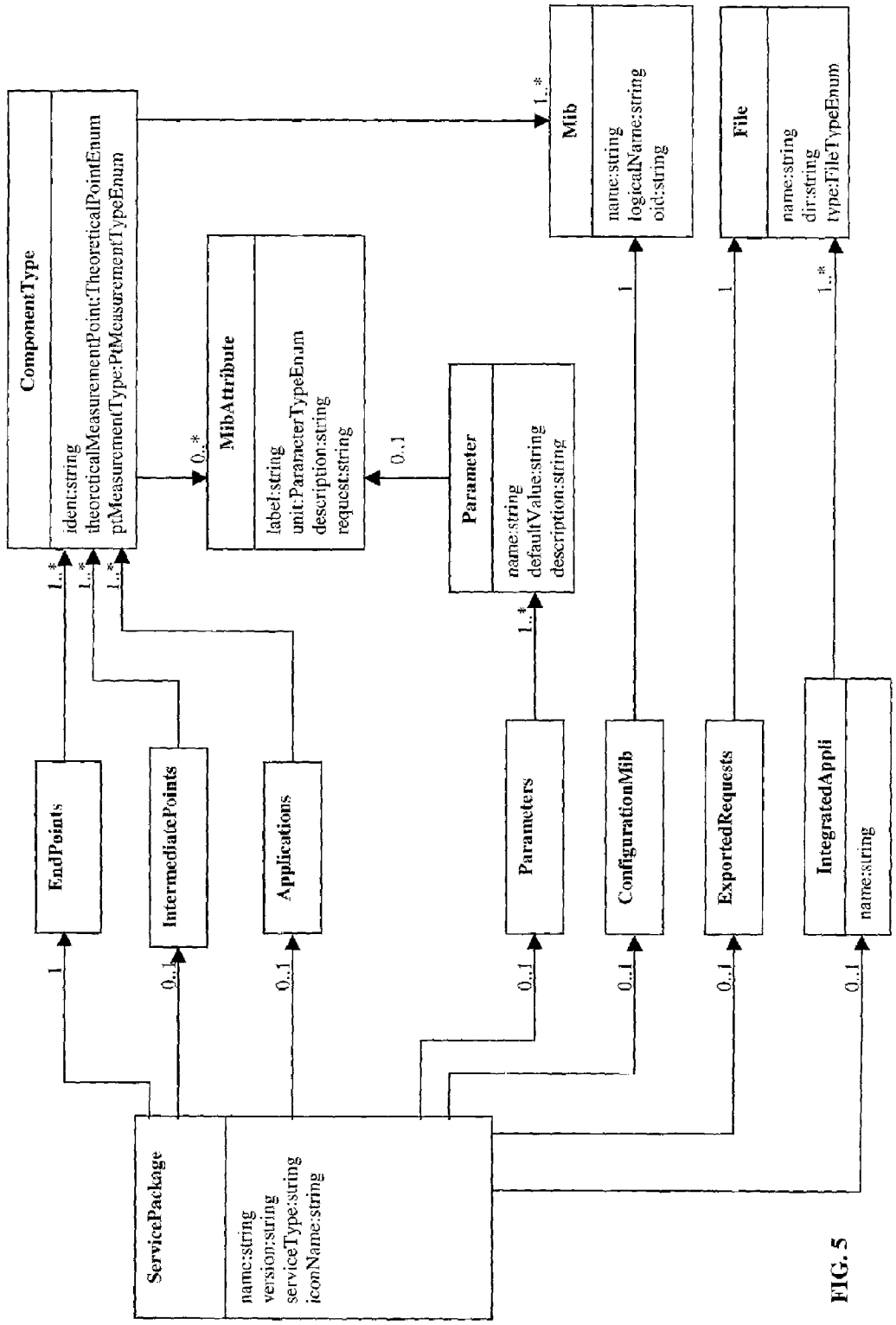
FIG. 5 illustrates an exemplary structure of the grammar of a service model used by the method of the invention represented in FIG. 4.

FIG. 5 illustrates the structure of a service model 80 which, in step S1 of the method, uses a grammar for describing a service model. The service model 80 illustrated comprises at least one component type model, in this case related to the various types of components 81 that can constitute the infrastructure of a telecommunication connection, and a parameter model 82. A service 85 is defined from the model 80 by specifying the components 86 and by giving the traffic configuration parameters 87. The model 80 of a telecommunication service 85 is described by a class ServicePackage that has the attributes:

name designating the name of the service model;

version designating the version of the service model;

serviceType designating the service type of the model; and iconName designating the name of the icon representing a service.

The class ServicePackage includes the various types of components 81 useable for the service model 80. These types are grouped into three categories.

The first category represents the end points of the services in a class EndPoints. These points in the network represent the entry and exit components of the service. During the creation of the service, these components must be defined by number and by type, as described in the model. These points are indispensable to the definition of the telecommunication service chosen as an example.

The second category represents intermediate points in the service in a class IntermediatePoints. These points represent intermediate network components in which the connection is supported. The model simply gives all of the possible types, but does not indicate a number of components to be defined for each type. This number varies from one service to another and can be zero. This category is therefore optional.

The third category represents the application components of the service in a class Applications. These components represent the points at which applications involved in the service, such as a billing application, are located This category is therefore optional.

These three categories of components are based on the same description of the component types, defined in a class Component Type. The class ComponentType has the attributes:

ident designating the identifier of the component type;

theoreticalMeasurementPoint designating the theoretical measurement point of the component according to a type TheoreticalPointEnum enumerating the theoretical measurement points, which can be the entry point of the service (pointA), the exit point of the service (pointZ) or an intermediate point of the service (pointI); and, optionally, ptMeasurementType designating the measurement point type of the component according to a type PtMeasurementTypeEnum for enumerating the measurement point types, which can be a connection (connection), an end point (endPoint) or a logical port (logicalPort).

The class ComponentType includes at least one MIB module supported by the component and described in a class Mib. The class Mib has the attributes:

name designating the name of the directory containing the MIB module based on the rules imposed by the management system 10;

logicalName designating the logical name of the MIB module used by the management system 10; and oid designating the identifier of the object on the highest level defined in the MIB module. The identifier "oid" (Object Identifier) is assigned uniquely throughout the world in accordance with a tree of addressing authorities defined by the ISO (International Standards Organization).

The class ComponentType also optionally includes the necessary parameters for representing the component in a class MibAttribute. The class MibAttribute has the attributes:

label designating the name of the attribute of the MIB module;

unit designating the type of the attribute of the MIB module;

description designating the description of the attribute of the MIB module; and request designating the CMIS request that makes it possible to navigate through the MIB module of the component in question in order to access the attribute directly.

The class ServicePackage also includes, as options:

a list of parameters, including traffic parameters in the example illustrated, defined in a class Parameters;

a MIB module described in a class ConfigurationMib and making it possible to browse the traffic parameters;

a CMIS request file to be installed, described in a class ExportedRequests. These requests are used to directly access the traffic parameters defined by the class Parameters or the specific parameters of the components defined by the class MibAttribute; and a third-party application, also called a partner application, for implementing the service, used for the service model and described in a class IntegratedAppli. While the application 42 for implementing the method is designed for the Applicant's OpenMaster® management system, a partner application is an application designed for another system.

The class Parameters contains at least one parameter described in a class Parameter that can be linked, as illustrated, to the class MibAttribute representing a pollable attribute on a component of the service. The class Parameter has the attributes:

name designating the name of the traffic parameter;

description designating the description of the parameter designated by name; and, optionally, defaultValue designating a default value for this parameter.

The class ConfigurationMib contains the MIB module required for browsing the parameters that is described in the class Mib.

The class ExportedRequests contains the CMIS request file to be installed, which is described in a class File. The class File describes a file to be processed based on its type and has the attributes:

name designating the name of the file; and, optionally, dir designating the destination directory of the file; and type designating the type of the file according to a type FileTypeEnum for enumerating the various possible file types, which can be an ASCII File to be copied (CopyFile), a file describing indicators to be collected (CollectFile), a file describing alarm filters (AlarmFilterFile), an ASCII export file from a CMIS request base to be imported (ImportCMISFile), a file to be executed (ExecuteFile), a file for starting the collection of the data (StartCollectFile) and a file for stopping the collection of the data (StopCollectFile), or an IDL file (IDLFile).

Finally, the class IntegratedAppli contains the description of the partner application that can be used for this service model and has the attribute name designating the name of the partner application. This class contains at least one file described in the class File.

The grammar for describing a service model 80, which is illustrated in FIG. 5 and described in UML language during step S1 of the method, is implemented during this same step S1 in XML language and is called DTD (Document Type Definition) grammar. Annex 1 illustrates the XML file corresponding to the DTD grammar of a service model 80. In order to perform the translation, rules for generating the DTD grammar have been applied to the previously defined UML model. To generate the DTD grammar from the previous description, the following is done:

a class of the description is translated into ELEMENT and reads as follows:

<ELEMENT ServicePackage ( . . . )> a class attribute is translated into an attribute of the element, such as the attribute ATTLIST in:

<ATTLIST ServicePackage version . . . > an association or an aggregation is translated into a sub-element of the current element, like Parameters in the following example:

<ELEMENT ServicePackage (Parameters)> and the cardinality of the association or the aggregation indicates the number of occurrences of the sub-element in the following way:

if 0 or 1: with a question mark ? such as

<ELEMENT ServicePackage (Parameters?)> if 1 and more: with the sign + such as:

<ELEMENT ServicePackage (Parameters+)> and if 0 or more: with the sign * such as:

<ELEMENT ServicePackage (Parameters*)>

Annex 2 illustrates an exemplary service model 80 created during step S4 in accordance with the DTD service grammar described in Annex 1. The service model 80 illustrated applies to Frame Relay technology.

Figure 6:
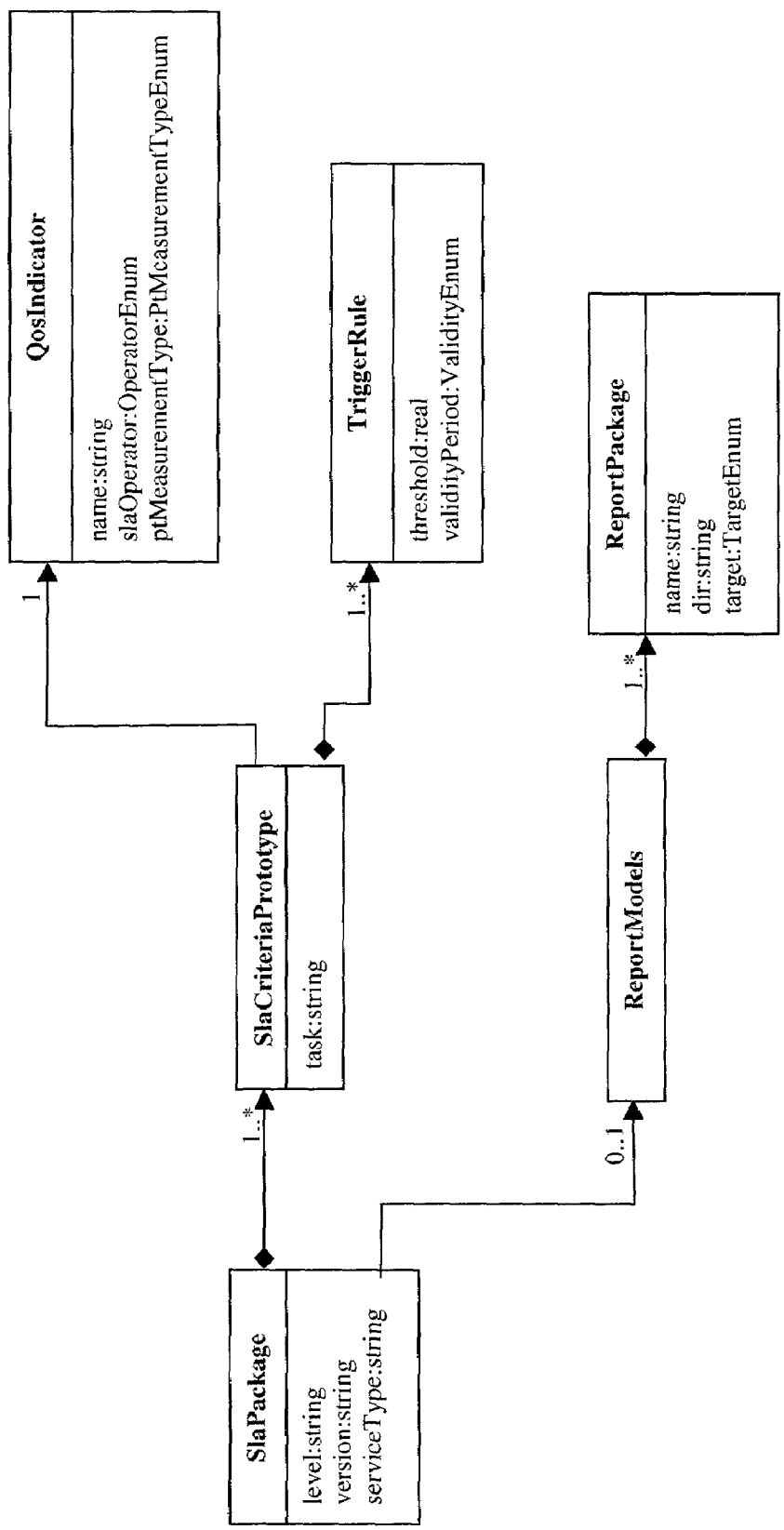
FIG. 6 illustrates an exemplary structure of the grammar of an SLA model used by the method of the invention represented in FIG. 4.

FIG. 6 illustrates the structure of a contract model 90, also called an SLA model 90, which uses the grammar for describing an SLA model during step S2 of the method. The contract 100 between the service provider and the client is generated from the SLA model 90 in step S11. As indicated in FIG. 4, the contract 100 primarily includes SLA criteria 101, which are the objects of the quality control of the service and which are defined from at least one SLA criteria prototype 91. An SLA criteria prototype 91 is defined as a model related to an SLA criterion for a given technology. The SLA model 90 is described by a class SlaPackage, which has the attributes:

level designating a contract level for the technology used; version designating a version of the SLA model; and serviceType designating a type of service.

The class SlaPackage contains at least one SLA prototype criterion 91, represented by a class SlaCriteriaPrototype, and optionally, at least one set of models 94 of reports to be generated, included in a class ReportModels. The class ReportModels includes all the models 94 of reports to be generated for all the destination targets. A set of report models 94 is defined for each destination target. The class ReportModels contains, by aggregation, one or more sets of models of reports to be generated per destination target. These models are represented by a class ReportPackage, which represents a set of models of reports to be generated for a given type of destination. It has the attributes:

name designating a name of a set of report models for a destination target defined by the attribute target;

dir designating a directory for the installation of the set of report models designated by name; and target designating a target for the set of report models, i.e., the intended user type based on a type of enumeration TargetEnum that defines the possible targets of the models of reports to be generated, which can be the billing entity (billing), the network entity (network), the service provision entity (provisioning) or the financial entity (financial).

The class SlaCriteriaPrototype contains only one QoS indicator model 93 represented by the class QoSIndicator and, by aggregation, at least one rule for triggering actions upon crossing a threshold represented by the class TriggerRule. The class SlaCriteriaPrototype has an attribute task designating the name of the task to be triggered upon crossing the threshold. A QoS indicator 103, in frame relay technology, can be the average time for repairing failures, known by the name MTTR (Mean Time to Repair) or the rate at which frames are delivered, known by the name FDR (Frame Delivery Ratio). The class QoSIndicator has the attributes:

name designating a name of a QoS indicator model;

slaOperator designating a default arithmetic operator, valid for a QoS indicator based on an enumeration type OperatorEnum that defines arithmetic operators of superiority (>, ·), inferiority, (<, ·) and equality (=); and optionally, ptMeasurementType (also defined in the class ComponentType in FIG. 4) designating the type of measurement point to which the QoS indicator relates, based on the enumeration type PtMeasurementTypeEnum, which defines measurement point types for the indicator, which can be a connection (connection), an end point (endPoint) or a logical port (logicalPort).

In practice, a QoS indicator 103 is measured at a variable frequency and is compared with a threshold 102, based on one of the arithmetic operators, in order to inform the customer when this operator is verified. For the sake of convenience, we'll say that the threshold 102 is crossed when the corresponding operator is verified. It is possible to set several additional thresholds, defining as many triggering rules as there are thresholds set, but only the first threshold is contractual. Thus, by adding, for example, one or more preliminary thresholds, it is possible to inform the customer of the approach or imminence of the condition chosen.

The class TriggerRule represents the rules for triggering actions upon crossing a threshold of an SLA criterion and has the attributes:

threshold designating an SLA criteria threshold to be monitored; and, optionally, validityPeriod designating a validity period of a threshold based on an enumeration type ValidityEnum of the possible validity periods for a threshold, in this case a red period (red) for times corresponding to intense traffic, a blue period (blue) for times corresponding to normal traffic, and a white period (white) for times corresponding to low traffic.

Only one threshold 102 being associated with a triggering rule, there are therefore as many triggering rules as there are thresholds to be monitored. In the example illustrated, the actions to be triggered upon crossing the threshold are performed by the service 63 contained in the platform 30 represented in FIG. 2 and used for managing the tasks of the management system 10. Upon crossing the threshold for a given indicator, an alarm is sent to the event processing service 63, which is waiting for this alarm. Upon receiving this alarm, the service 63 activates the task in question so as to trigger at least one action linked to the threshold crossed, which could be, for example, the sending of an email and the generation of reports.

Figure 7:
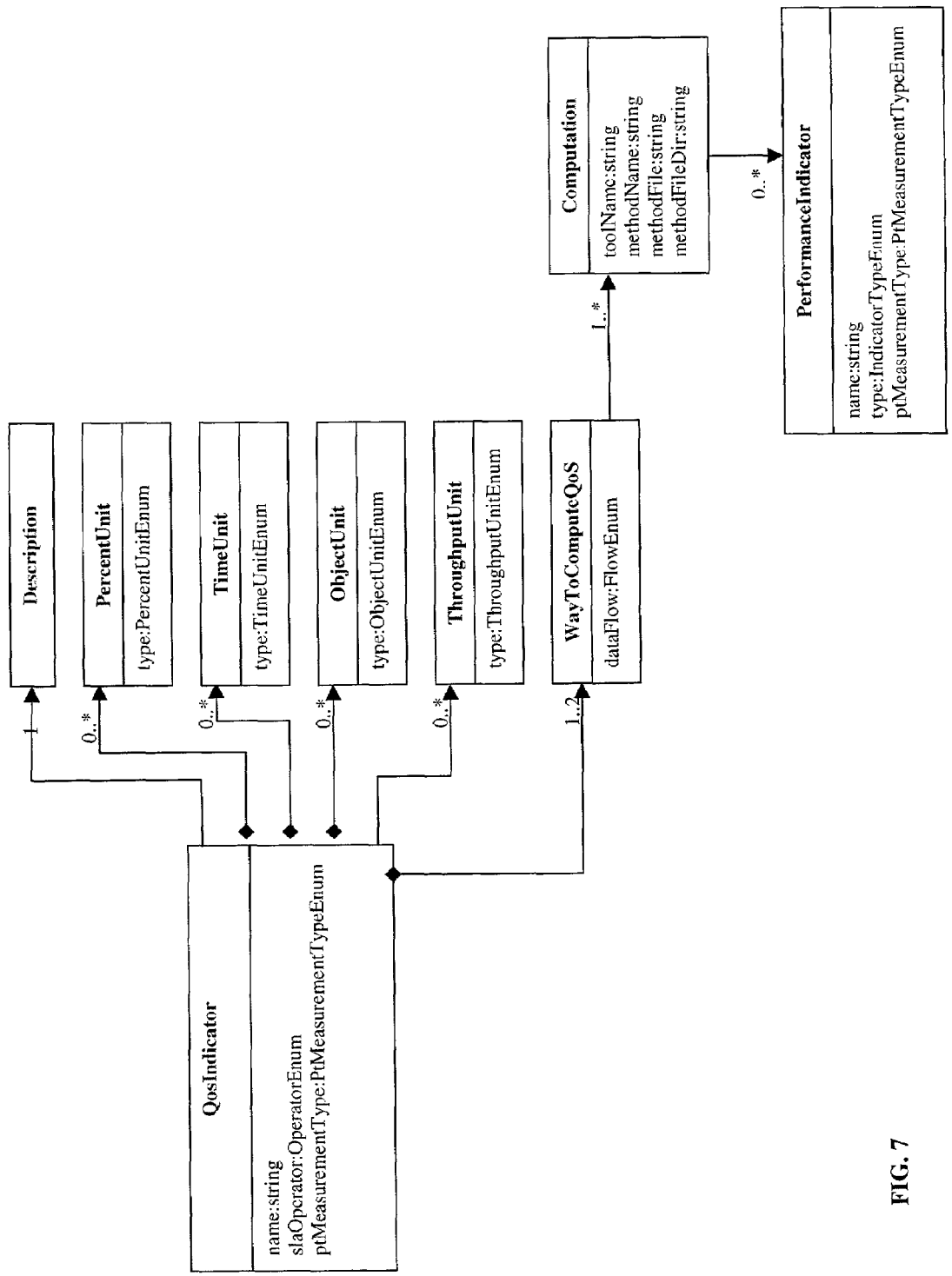
FIG. 7 illustrates an exemplary structure of a quality of service indicator used by the method of the invention represented in FIG. 4.

FIG. 7 illustrates an exemplary structure of a QoS indicator model 93, defined by the class QoSIndicator, which contains:

a textual description of the indicator, defined in a class Description;

at least one valid unit for this indicator, in this case chosen from the four units represented by four classes that respectively relate to units of percentage PercentUnit, time TimeUnit, objects ObjectUnit, and throughput ThroughputUnit, and at least one and no more than two modes for collecting the QoS indicator, respectively related to the two possible directions of data flow and modeled by a class WayToComputeQoS. Each collection mode is associated with at least one computation rule per collection tool, which is represented by a class Computation. A computation rule can use parameters represented by performance indicators in a class PerformanceIndicator.

The class PercentUnit describes a unit of the percentage type and has an attribute type designating the percentage type unit chosen. The value of this attribute must conform to an enumeration type PercentUnitEnum of the possible percentage units, in this case %.

The class TimeUnit describes a unit of the time type and has an attribute type designating the time type unit chosen. The value of this attribute must conform to an enumeration type TimeUnitEnum of the possible time units, in this case microseconds (· s), milliseconds (ms), seconds (s), minutes (m), and hours (h).

The class ObjectUnit describes a unit of the object type and has an attribute type designating the object type unit chosen. The value of this attribute must conform to an enumeration type ObjectUnitEnum of the possible object units, in this case bits (bits), kilobits (kbits), bytes (bytes), kilobytes (kb), megabytes (Mb), gigabytes (Gb), frame (Frame), incident (Incident) and flow (Flow).

The class ThroughputUnit describes a unit of the throughput type and has an attribute type designating the throughput type unit chosen. The value of this attribute must conform to an enumeration type ThroughputUnitEnum of the possible throughput units, in this case bits per second (bits/s), bytes per second (bytes/s), kilobytes per second (kb/s), packets per second (packet/s), and flow per second (Flow/s).

A QoS indicator can be computed in both data flow directions of the connection, in different ways depending on the direction. The class WayToComputeQoS has an attribute dataFlow representing the direction of the data flow according to an enumeration type FlowEnum of the possible directions, which can be, for a connection between two end points A and Z, the directions A-Z and Z-A (A-Z, Z-A), and for a port, the receiving direction R and the transmitting direction T (R, T);

The class Computation describes a computation/extraction rule for an indicator, the rule being written in a method and the class having the attributes:

toolName designating the name of the tool used by the method; and optionally, methodName designating the name of the method for performing the computation/extraction of the indicator and involving the attributes:

methodFile designating the file containing the name of the method methodName; and methodFileDir designating the installation directory of the file designated by methodFile. In the present case, this directory (not illustrated) is located in the manager 17.

Figure 8:
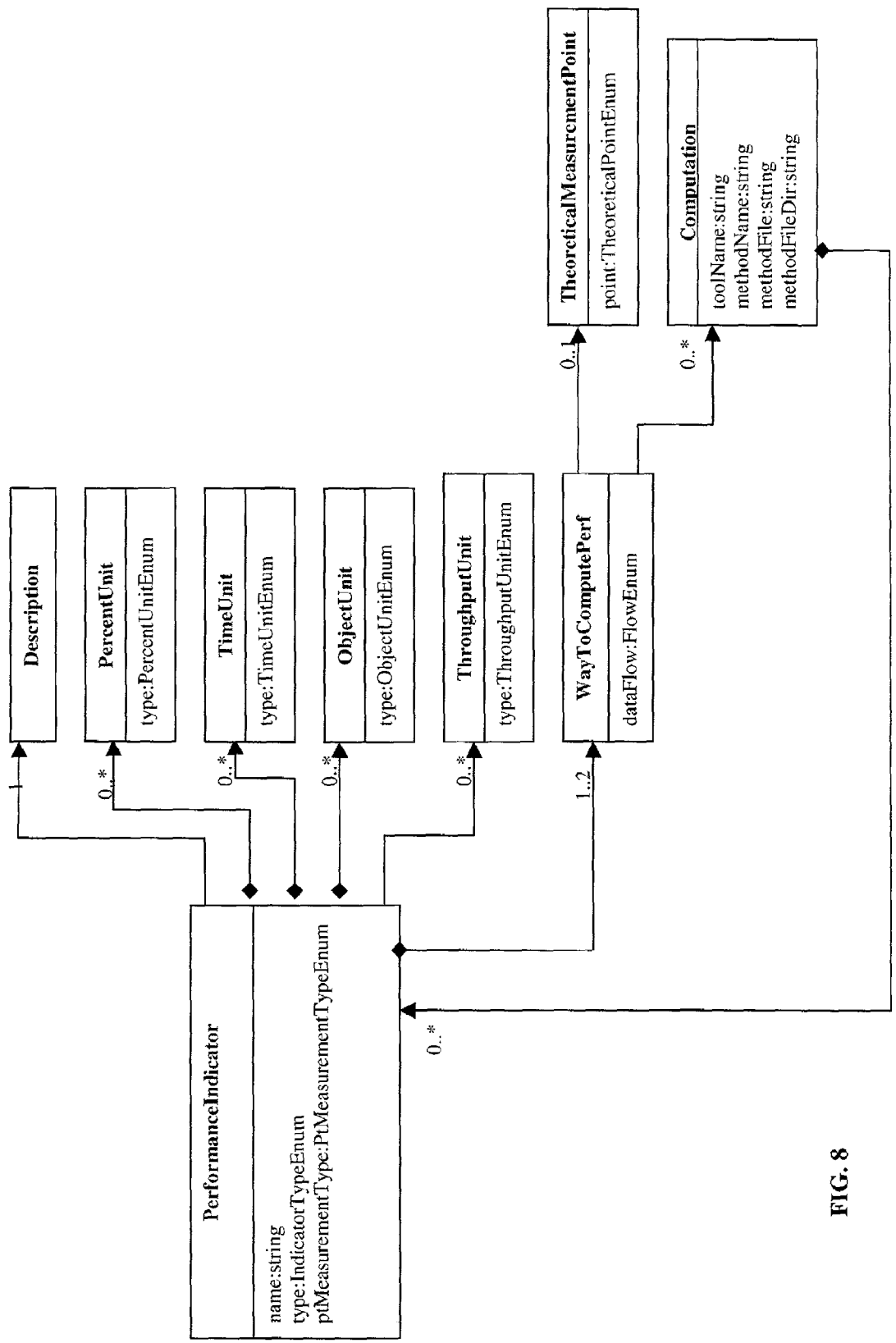
FIG. 8 illustrates an exemplary structure of a performance indicator used by the method of the invention represented in FIG. 4.

FIG. 8 illustrates an exemplary structure of a performance indicator defined by the class PerformanceIndicator represented in FIG. 7. Unlike a QoS indicator, which applies to an end-to-end connection and is subject to a contractual threshold, a performance indicator applies to a piece of network equipment and is not subject to a contractual threshold. A QoS indicator, being related to a connection, i.e., to an array of network equipment, can be an aggregation of several performance indicators. This is why the mode for computing a QoS indicator can include performance indicators as parameters. The performance indicator illustrated in FIGS. 7 and 8 is described by the class PerformanceIndicator, which has the attributes:

name designating the name of the performance indicator:

type designating the type of the indicator according to an enumeration type IndicatorTypeEnum of the indicator types, in this case a basic indicator type (basic) and a computed indicator type (computed). A basic indicator is calculated by a collection tool, while a computed indicator is aggregated from other indicators; and ptMeasurementType designating the type of measurement point to which a performance indicator relates, according to an enumeration type PtMeasurementTypeEnum.

The class PerformanceIndicator contains:

necessarily, a textual description of the indicator, defined in the class Description, also represented in FIG. 6;

at least one valid unit, in this case chosen from the four units represented by the classes PercentUnit, TimeUnit, ObjectUnit, and ThroughputUnit; and a at least one and no more than two modes for collecting the performance indicator, depending on the direction of the data flow.

The collection mode is modeled by a class WayToComputePerf, which has the attribute dataFlow designating a data flow direction according to the enumeration type FlowEnum. As with a QoS indicator 103, a performance indicator can be computed in both data flow directions of the equipment, and in different ways depending on the direction. If the indicator is the computed type, the class WayToComputePerf can be associated with the class Computation, which defines a rule for the computation/extraction of the indicator by the collection tool. As described above, this computation rule can optionally have other performance indicators PerformanceIndicator as parameters in the case where the performance indicator described is itself composed of other indicators. If the indicator is the basic type, it has no computation/extraction rule, but it has a theoretical measurement point defined by a class TheoreticalMeasurementPoint associated with the class WayToComputePerf and through which it is possible to obtain its value. The class TheoreticalMeasurementPoint describes the theoretical measurement point of a basic type performance indicator. There is only one measurement point for an indicator. If the indicator is the computed type, there is no associated measurement point. The class has an attribute point designating the theoretical measurement point in accordance with the type TheoreticalPointEnum.

Annex 3 illustrates the XML file corresponding to the DTD grammar of the SLA model, which has just been described in UML language during step S2 of the method represented in FIG. 4. The same translation rules defined for the grammar of the service model have been applied for this file. Annex 4 illustrates an exemplary SLA model 90 obtained in step S5 and conforming to the DTD grammar described in Annex 3. The SLA model 90 illustrated applies to the Frame Relay technology of an operator named op for a contract with a level named silver.

FIG. 9 illustrates the structure of a model 110 for describing at least one SLA tool 120, which during step S3 of the method uses the grammar of an SLA tool description model. An SLA tool description model 110 defines, for a given technology and a given piece of equipment, tools 120 required to measure the quality of service described in an SLA model and based on a given service model 80. The SLA tool description model 110 illustrated is described by the class SlaToolsPackage, which has the attributes:

a version designating the version of the SLA tool model;

serviceType designating the type of service with which the SLA tool description model 110 is associated;

manufacturer designating the name of the manufacturer of the equipment (a router, for example) supported by this SLA tool model;

equipment designating the name of the equipment supported by this SLA tool model; and equipmentVersion designating the version of the equipment supported by this SLA tool model.

The class SlaToolsPackage can contain, as illustrated at least one collection mode usable for the SLA model, in this case:

an agent-based collection mode represented by a class AgentData, wherein the data comes from an agent 18;

a log-based collection mode represented by a class LogData, wherein the data comes from a log 20, 22, 67;

an alarm-based collection mode represented by the class AlarmData, wherein the data comes from filtered alarms stored in the log 65; and optionally, a third-party application based (other than OpenMaster in the example illustrated), represented by the class ApplData and wherein the data comes from the third-party application; and at least one application configuration description, other than the collection tools, usable for measuring quality of service and represented by the class ConfigData.

The class AgentData represents the agent 18 based collection mode of a tool. It has the attribute toolName designating the name of the agent 18. It optionally describes the configuration information required by this tool, such as the information represented by the class Mib illustrated in FIG. 4 and related to the basic Mib modules supported by the agent and that defined for the component types of the corresponding service model, and that represented by the class File illustrated in FIG. 4 and containing the automatic installation files and the collection files, in the logs 20, 22 and 67, of indicators to be installed, and preferably the configuration file or files specific to the agent.

The class LogData represents the log 20, 22, 67 based collection mode of a tool. It optionally describes the configuration information required by this tool, such as the information related to the class AgentData and contained in the classes Mib and File. The class LogData has the attributes:

toolName designating the name of the log-based collection tool;

logName designating the name of the log 20, 22, 67 of indicators collected by the tool designated by tool-Name;

logDir designating the directory in which the log designated by logName must be installed;

namingRule designating the rule for naming instances in the log designated by logName;

repatratriationMode designating the repatriation mode of the log designated by logName.

The class AlarmData represents the alarm-based collection mode of a tool. It has the attribute toolName designating the name of the tool collecting the alarms, for example the tool 64. It optionally describes configuration information required by the tool, such as that related to the class AgentData and contained in the classes Mib and File.

The class AppliData represents the third-party application based collection mode. It has the attribute toolName designating the name of the third-party application and optionally describes the configuration information required by this tool, such as that related to the class AgentData and contained in the classes Mib and File.

The class ConfigData represents the description of the configuration of an application outside the collection tool to be configured for implementing the quality measurement. The application to be configured can, in this case, be an OpenMaster application 42 or a third-party application. The class ConfigData has the attribute toolName designating the name of the application to be configured and optionally contains the files required for the configuration or for the automatic installation of the application.

Annex 5 illustrates the XML file corresponding to the grammar of the SLA tool description model that has just been specified in the UML language during step S3 of the method. The same translation rules defined for the grammar of the service model and the grammar of the SLA model have been applied for this file. Annex 6 illustrates an exemplary SLA tool description model 110 obtained in step S6 and conforming to the DTD grammar described in the file of Annex 5.

It is clear that the current grammars reference collection files and report model files. These files are currently external and conform to a text format (ascii) specific to the Report service of the Applicant's OpenMaster® product. The specification of a DTD grammar for these models is conceivable. It is therefore possible to reference, in the DTD grammars of the SLA models and the SLA tool description models, the DTD grammars of the collection files and the report models.

The invention specifically offers the following advantages. A DTD grammar makes it possible to clearly define complex structures like those that describe a service model, an SLA model or an SLA tool description model. The invention also makes it possible to reuse a DTD grammar, particularly in order to extend it, or to insert it into another DTD, or even to use it with and adapt it to another service application. The invention also makes it possible to easily create models in XML language. One need only keep track of the DTD grammars created in order to know what should be put in a model. Nevertheless, the XML documents can be written more or less easily, depending on the graphical editors used. Three types of these tools are currently known. A simple text editor can suffice, but it does not make it possible to verify XML documents. A text editor with the XML mode allows verification. The best tool is an editor specially designed for the XML language. An editor of this type knows how to read the DTD grammars written and offers an entry aid and an effective validation of what has been written. Moreover, the models based on these XML grammars created by a software integrator (which writes the models adapted to its customers) can be easily validated by tools on the market for analyzing an XML file in a given DTD grammar.

In addition, the invention produces a generic, exhaustive and synthetic description of the information to be supplied in order to measure and monitor the quality of service. Service models are created for a technology, independent of a quality contract. SLA models are created for a given technology, independent of the collection tools and the equipment, in order to model the various contract levels applicable to the monitoring of a service. SLA tool description models are created for a given technology and piece of equipment, in order to define the tools that can be used to verify the contract. An SLA tool description model is only installed in the management system 10 if an SLA model defining the model of the contract, and a service model defining the equipment subject to measurement, for a given technology, have already been installed. One then need only create a new SLA tool description model in order to accommodate a new piece of equipment for this technology. The description of these models then makes it possible to synthetically and exhaustively describe the information concerning the measurement and the monitoring of the quality of service of a telecommunication service.

It is clear from the preceding description that the invention can be applied to any service that includes at least one technical component, which may be physical, such as a connection in the example chosen, and/or applicative as also illustrated. Any modeling language in object-oriented technology can be used. It is also clear that each structure can generate at least one respective model, and that each model can also generate at least one unit such as a service, a contract and a collection tool.

It is also clear that the quality of service control method can be used in a restricted way to construct services from a service model structure. In this case, the method can no longer perform quality control, but it can be used to monitor at least one service. Service monitoring is specifically used to learn the services and their conditions. Hence, the first subject of the invention is a method for monitoring a service 85 that includes at least one technical component 86 defined according to one of several possible technologies and comprising: a description (S1, Annex 1), produced in a modeling language in object-oriented technology (UML, XML) and independent of said technologies, of the structure of a service model 80; the construction (S4, Annex 2) of a service model 80 from the description of said structure; the construction (S7) of the service 85 from the service model 80; and the monitoring of the service thus constructed. In this definition, a service is the base, the method being applied in the same way to any set of services.

More generally, the second subject of the invention is a method for controlling the quality of a service 85 that includes at least one technical component 86 defined according to one of several possible technologies, the quality of service being defined by a technical contract 100 between the provider of the service and a customer, and the contract 100 including quality criteria 101 associated with thresholds 102 and related to said technology. The method comprises: a description (S1, S2, S3, Annexes 1, 3, 5), produced in a modeling language in object-oriented technology (UML, XML) and independent of said technologies, of the structure of a service model 80, a contract model 90 and at least one collection tool model 110 from the respective descriptions of said structures; the construction in steps S7-S9 of the service 85, the contract 100 and at least one collection tool (120) from the respective models (80, 90, 110); the collection, in step S10, of quality of service indicators 103 using at least said tool 120; and the comparison, in step S11, of the quality indicators 103 with the thresholds 102 defined in the contract 100. In this definition, a service is the base, the method being applied in the same way to any set of services.

According to the example illustrated, the description (S1, Annex 1) of the structure of a service model 80 is produced from a service model class ServicePackage that includes at least one model 81 related to at least said component 86 and defined in a component class (EndPoints, Applications) in said possible technologies. Additionally, at least said component 86 can be described in a component type class ComponentType. When the method is implemented by a management system 10 that includes a management information base called a MIB, as in the example chosen, the component type class ComponentType can advantageously be associated with a class Mib representing at least one module of the base MIB. The description of a component type in the class ComponentType can therefore also include a MIB module attribute class MibAttribute that allows requests to access, in the base MIB, at least one attribute representing the component type.

When the service includes parameters, the service model class ServicePackage can advantageously include at least one parameter related to the service and defined in a parameter class Parameters. This class can, as illustrated, be linked to the MIB module attribute class MibAttribute when the method is used by a management system 10 that includes a base MIB. The service model class ServicePackage can therefore also include at least one request file to be installed, defined in a class ExportedRequests and making it possible to obtain at least one value related to at least said parameter defined by the class Parameters. It can also make it possible to obtain at least one value of at least one parameter defined by the class MibAttribute. It can also make it possible to obtain at least one specific parameter of the component type defined by the class ComponentType. The service model class ServicePackage can advantageously include, as illustrated, a MIB module making it possible to browse said parameters and described in a class ConfigurationMib attached to class Mib. The class ServicePackage can also include an application (42, third party) for implementing the service 85, defined in a class (IntegratedAppli) and linked to at least one file making it possible to use the application for implementing the service and defined in a class File. All of these classes can clearly be implemented by the service monitoring method.

In the example illustrated, the description produced in step S2 of the structure of a contract model 90 is produced from a criteria model class SlaPackage that includes at least one criteria prototype defined in a class SlaCriteriaPrototype according to one of said possible technologies, this class being associated with a class QoSIndicator representing quality of service indicators 103 as well as at least one class TriggerRule representing at least one rule for triggering at least one action when a threshold 102 is reached. The class QoSIndicator can advantageously include a description defined in a class Description, at least one class representing a threshold unit (PercentUnit, TimeUnit, ObjectUnit, ThroughputUnit) and at least one class WayToComputeQoS representing at least one mode for computing a quality of service indicator. The class WayToComputeQoS can be associated with at least one computation rule defined in a class Computation. This last class can optionally have at least one performance indicator contained in a class PerformanceIndicator that includes a description defined in said class Description, at least the threshold unit class (PercentUnit, TimeUnit, ObjectUnit, ThroughputUnit) and at least one class WayToComputePerf representing at least one mode for collecting a performance indicator. When the performance indicator is basic, the collection mode defined by the class WayToComputePerf can be applied to a theoretical measurement point defined by a class TheoreticalMeasurementPoint. When the performance indicator is computed, the collection mode described in the class WayToComputePerf can be represented by the computation rule class Computation optionally having as (a) parameter(s) at least one other performance indicator contained in the class PerformanceIndicator.

It is also clear that, in an advantageous variant illustrated, the criteria model class SlaPackage also includes, in a report model class ReportModels, at least one set of quality of service control report models 94.

The description (S3, Annex 5) of the structure of at least one collection tool model can, as in the example illustrated, be produced from a tool model class SlaToolsPackage designed to implement the collection and comparison steps (S10, S11) and optionally including at least one class (AgentData, LogData, AlarmData, ApplData) representing a mode for collecting quality indicators and/or at least one description in a class ConfigData for configuring a computer application (42 or third party).

Related subjects of the invention are the model, contract and collection tool structures, as well as the models and units (services, contracts and tools) derived from them. Other related subjects are a management system 10 and an information system 11 used to implement the service monitoring method or the quality of service control method.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

ANNEX 1
DTE Grammar of a Service Model

```
<! ELEMENT ServicePackage    (Parameters?, EndPoints, IntermediatePoints?,
Applications?, ConfigurationMib?, ExportedRequests?, IntegratedAppli?)>
<!ATTLIST ServicePackage     name         CDATA #REQUIRED>
<!ATTLIST ServicePackage     version          CDATA #REQUIRED>
<!ATTLIST ServicePackage     serviceType  CDATA #REQUIRED>
<!ATTLIST ServicePackage     iconName     CDATA #REQUIRED>
<!ELEMENT Parameters (Parameter+)>
<!ELEMENT EndPoints            (ComponentType+)>
<!ELEMENT IntermediatePoints   (ComponentType+)>
<!ELEMENT Applications         (ComponentType+)>
<!ELEMENT ConfigurationMib     (Mib)>
<!ELEMENT ExportedRequests     (File)>
<!-- IntegratedAppli -->
<!ELEMENT IntegratedAppli      (File, File+)>
<!ATTLIST IntegratedAppli      name        CDATA #REQUIRED>
<!-- Parameter -->
<!ELEMENT Parameter   (MibAttribute?)>
<!ATTLIST Parameter    name            CDATA #REQUIRED>
<!ATTLIST Parameter    defaultValue        CDATA #IMPLIED>
<!ATTLIST Parameter    description     CDATA #REQUIRED>
<!-- ComponentType -->
<!ELEMENT ComponentType    (Mib*, MibAttribute*)>
<!ATTLIST ComponentType    ident CDATA #REQUIRED>
<!ATTLIST ComponentType    theoreticalMeasurementPoint CDATA #REQUIRED>
<!ATTLIST ComponentType    ptMeasurementType    CDATA #IMPLIED>
<!-- Mib -->
<!ELEMENT Mib EMPTY>
<!ATTLIST Mib name             CDATA #REQUIRED>
<!ATTLIST Mib logicalName      CDATA #REQUIRED>
<!ATTLIST Mib oid           CDATA #REQUIRED>
<!-- MibAttribute -->
<!ELEMENT MibAttribute EMPTY>
<!ATTLIST MibAttribute label        CDATA #REQUIRED>
<!ATTLIST MibAttribute unit         CDATA #REQUIRED>
<!ATTLIST MibAttribute description    CDATA #REQUIRED>
<!ATTLIST MibAttribute request            CDATA #REQUIRED>
<!-- File -->
<!ELEMENT File EMPTY>
<!ATTLIST File name    CDATA #REQUIRED>
<!ATTLIST File dir     CDATA #REQUIRED>
<!ATTLIST File type    CDATA #REQUIRED>
```

ANNEX 2
Exemplary Service Model

This exemplary service model has been created for a service in Frame Relay technology, in accordance with the DTD grammar of Annex 1.

```
<?xml version="1.0" encoding="ISO-8859-1"?>
<!DOCTYPE ServicePackage SYSTEM "packageService.dtd">
<ServicePackage iconName="service.icon" serviceType="fr"
version="1.0" name="srv_rfc1604">
 <Parameters>
  <Parameter name="Bc" defaultValue="70" description="Committed Burst Size"/>
  <Parameter name="Ec" defaultValue="85" description="Excess Burst Size"/>
 </Parameters>
<EndPoints>
  <ComponentType ident="FrPtA" theoreticalMeasurementPoint="pointA">
    <Mib name="rfc1604" logicalName="rfc1604" oid="1.3.6.1.2.1.10.44"/>
    <MibAttribute label="FRLogicalPort" request="reqGetFRLP"
description="Frame Relay Logical Port" unit="integer" />
    <MibAttribute label="DLCI" request="reqGetDLCI" description="Data Link Control Identifier" unit="integer" />
  </ComponentType>
  <ComponentType ident="FrPtZ" theoreticalMeasurementPoint="pointZ">
    <Mib name="rfc1604" logicalName="rfc1604"
oid="1.3.6.1.2.1.10.44"/>
    <MibAttribute label="FRLogicalPort" request="reqGetFRLP"
description="Frame Relay Logical Port" unit="integer" />
    <MibAttribute label="DLCI" request="reqGetDLCI" description="Data Link Control Identifier" unit="integer" />
  </ComponentType>
</EndPoints>
<Applications>
```

```
<ComponentType ident="ARS"
theoreticalMeasurementPoint="pointA"></ComponentType>
 </Applications>
<ExportedRequests>
    <File name="svr_fc1604.export" dir="$ISMROOT/var/import/telecom"
type="importCMISFile"/>
 </ExportedRequests>
</ServicePackage>
```

ANNEXE 3
DTD Grammar of an SLA Model

```
<!ELEMENT SlaPackage        (SlaCriteriaPrototype+, ReportModels?)>
<!ATTLIST SlaPackage        level           CDATA #REQUIRED>
<!ATTLIST SlaPackage        version                 CDATA #REQUIRED>
<!ATTLIST SlaPackage        serviceType     CDATA #REQUIRED>
<!-- SlaCriteriaPrototype -->
<!ELEMENT SlaCriteriaPrototype (QosIndicator, TriggerRule+)>
<!ATTLIST SlaCriteriaPrototype task CDATA #REQUIRED>
<!-- QosIndicator -->
<!ELEMENT QosIndicator (Description,
((PercentUnit+) | (TimeUnit+) | (ObjectUnit+) | (ThroughputUnit+)),
WayToComputeQoS+)>
<!ATTLIST QosIndicator      name                    CDATA #REQUIRED>
<!ATTLIST QosIndicator      slaOperator             CDATA #REQUIRED>
<!ATTLIST QosIndicator      ptMeasurementType       CDATA #IMPLIED>
<!ELEMENT Description       (#PCDATA)>
<!ELEMENT PercentUnit       EMPTY>
<!ATTLIST PercentUnit       type CDATA      #REQUIRED>
<!ELEMENT TimeUnit          EMPTY>
<!ATTLIST TimeUnit          type CDATA      #REQUIRED>
<!ELEMENT ObjectUnit        EMPTY>
<!ATTLIST ObjectUnit        type CDATA      #REQUIRED>
<!ELEMENT ThroughputUnit            EMPTY>
<!ATTLIST ThroughputUnit            type CDATA      #REQUIRED>
<!ELEMENT WayToComputeQoS (Computation+)>
<!ATTLIST WayToComputeQoS dataFlow CDATA #REQUIRED>
<!ELEMENT Computation (PerformanceIndicator*)>
<!ATTLIST Computation toolName                      CDATA #REQUIRED>
<!ATTLIST Computation methodName      CDATA #REQUIRED>
<!ATTLIST Computation methodFile      CDATA #REQUIRED>
<!ATTLTST Computation methodFileDir   CDATA #REQUIRED>
<!-- PerformanceIndicator -->
<!ELEMENT PerformanceIndicator         (Description,
(PercentUnit+ | TimeUnit+ | ObjectUnit+ | ThroughputUnit+),
WayToComputePerf+)>
<!ATTLIST PerformanceIndicator          name    CDATA #REQUIRED>
<!ATTLIST PerformanceIndicator          type    CDATA #REQUIRED>
<!ELEMENT WayToComputePerf (TheoreticalMeasurementPoint?, Computation?)>
<!ATTLIST WayToComputePerf dataFlow CDATA #REQUIRED>
<!ELEMENT TheoreticalMeasurementPoint EMPTY>
<!ATTLIST TheoreticalMeasurementPoint point    CDATA #REQUIRED>
<!-- TriggerRule -->
<!ELEMENT TriggerRule EMPTY>
<!ATTLIST TriggerRule threshold                 CDATA #REQUIRED>
<!ATTLIST TriggerRule validityPeriod            CDATA #IMPLIED>
<!-- ReportModels -->
<!ELEMENT ReportModels          (Reportpackage+)>
<!-- ReportPackage -->
<!ELEMENT ReportPackage EMPTY>
<!ATTLIST ReportPackage name    CDATA #REQUIRED>
<!ATTLIST ReportPackage dir     CDATA #REQUIRED<
<!ATTLIST ReportPackage target          CDATA #REQUIRED>
```

ANNEX 4
Exemplary SLA Model

This exemplary SLA model has been created for a service in Frame Relay technology
and for a quality of service of level silver, in accordance with the DTD grammar described in
Annex 3.

```
<?xml version="1.0" encoding="ISO-8859-1"?>
<!DOCTYPE SlaPackage SYSTEM "packageSla.dtd">
<SlaPackage serviceType="fr" version="1.0" level="silver">
 <SlaCriteriaPrototype task="taskCriterial">
  <QosIndicator slaOperator=">" name="FDR">
   <Description>Frame Delivery Ratio</Description>
   <!-- one of (ThroughputUnit+ ObjectUnit+ TimeUnit+ PercentUnit+)-->
   <!PercentUnit type="%"/>
   <WayToComputeQoS dataFlow=37 A-Z">
    <Computation toolName="PMS" methodFile="calcFDR.class"
methodName="calcFDR" methodFileDir=".">
```

-continued

```
    <PerformanceIndicator type="basic" name="txFrames">
      <Description>Number of outgoing frames</Description>
      <!-- one of (ThroughputUnit+ ObjectUnit+ TimeUnit+
PercentUnit+)-->
      <ObjectUnit type="Frame"/>
      <WayToComputePerf dataFlow="A-Z">
      <TheoreticalMeasurementPoint point="pointZ"/>
      </WayToComputePerf>
    </PerformanceIndicator>
    <PerformanceIndicator type="basic" name="rxFrames">
      <Description>Number of incoming frames</Description>
      <!-- one of (ThroughputUnit+ ObjectUnit+ TimeUnit+
PercentUnit+)-->
      <ObjectUnit type="Frame"/>
      <WayToComputePerf dataFlow="A-Z">
      <TheoreticalMeasurementPoint point="pointA"/>
      </WayToComputePerf>
    </PerformanceIndicator>
   </Computation>
  </WayToComputeQoS>
  <WayToComputeQoS dataFlow="Z-A">
   <Computation toolName="PMS" methodFile="calcFDR.class"
methodName="calcFDR" methodFileDir=".">
    <PerformanceIndicator type="basic" name="txFrames">
      <Description>Number of outgoing frames</Description>
      <!-- one of (ThroughputUnit+ ObjectUnit+ TimeUnit+
PercentUnit+)-->
      <ObjectUnit type="Frame"/>
      <WayToComputePerf dataFlow="Z-A">
      <TheoreticalMeasurementPoint
point="pointA"></TheoreticalLMeasurementPoint>
      </WayToComputePerf>
    </PerformanceIndicator>
    <PerformanceIndicator type="basic" name="rxFrames">
      <Description>Number of incoming frames</Description>
      <!-- one of (ThroughputUnit+ ObjectUnit+ TimeUnit+
PercentUnit+)-->
      <ObjectUnit type="Frame"/>
      <WayToComputePerf dataFlow="Z-A">
      <TheoreticalMeasurementPoint
point="pointA"></TheoreticalMeasurementPoint>
      </WayToComputePerf>
     </PerformanceIndicator>
    </Computation>
   </WayToComputeQoS>
  </QosIndicator>
  <TriggerRule threshold="80"/>
 </SlaCriteriaPrototype>
 <ReportModels>
  <ReportPackage target="billing" dir="$ISMROOT/var/config/REPORT"
name="rfc1604-bill.odc">
  </Report Package>
  <ReportPackage target="network" dir="$ISMROOT/var/config/REPORT"
name="rfc1604-Net.odc">
  </Report Package>
 </ReportModels>
</SlaPackage>
```

ANNEX 5
DTD Grammar of an SLA Tool Description Model

```
<?xml version="1.0" encoding="ISO-8859-1"?>
<!DOCTYPE SlaPackage SYSTEM "packageSla.dtd">
<SlaPackage serviceType="fr" version="1.0" level="silver">
 <SlaCriteriaPrototype task="taskCriteria1">
  <QosIndicator slaOperator=">" name="FDR">
   <Description>Frame Delivery Ratio</Description>
   <!-- one of (ThroughputUnit+ ObjectUnit+ TimeUnit+ PercentUnit+)-->
   <PercentUnit type="%"/>
   <WayToComputeQoS dataFlow="A-Z">
    <Computation toolName="PMS" methodFile="calcFDR.class"
methodName="calcFDR" methodFileDir=".">
     <PerformanceIndicator type="basic" name="txFrames">
      <Description>Number of outgoing frames</Description>
      <!-- one of (ThroughputUnit+ ObjectUnit+ TimeUnit+
PercentUnit+)-->
      <ObjectUnit type="Frame"/>
      <WayToComputePerf dataFlow="A-Z">
      <TheoreticalMeasurementPoint point="pointZ"/>
      </WayToComputePerf>
```

-continued

```
    </PerformanceIndicator>
    <PerformanceIndicator type="basic" name="rxFrames">
      <Description>Number of incoming frames</Description>
      <!-- one of (ThroughputUnit+ ObjectUnit+ TimeUnit+ PercentUnit+)-->
      <ObjectUnit type="Frame"/>
      <WayToComputePerf dataFlow="A-Z">
      <TheoreticalMeasurementPoint point="pointA"/>
      </WayToComputePerf>
    </PerformanceIndicator>
   </Computation>
  </WayToComputeQoS>
  <WayToComputeQoS dataFlow="Z-A">
   <Computation toolName="PMS" methodFile="calcFDR.class" methodName="calcFDR" methodFileDir=".">
    <PerformanceIndicator type="basic" name="txFrames">
      <Description>Number of outgoing frames</Description>
      <!-- one of (ThroughputUnit+ ObjectUnit+ TimeUnit+ PercentUnit+)-->
      <ObjectUnit type="Frame"/>
      <WayToComputePerf dataFlow="Z-A">
      <TheoreticalMeasurementPoint point="pointA"></TheoreticalMeasurementPoint>
      </WayToComputePerf>
    </PerformanceIndicator>
    <PerformanceIndicator type="basic" name="rxFrames">
      <Description>Number of incoming frames</Description>
      <!-- one of (ThroughputUnit+ ObjectUnit+ TimeUnit+ PercentUnit+)-->
      <ObjectUnit type="Frame"/>
      <WayToComputePerf dataFlow="Z-A">
      <TheoreticalMeasurementPoint point="pointA"></TheoreticalMeasurementPoint>
      </WayToComputePerf>
    </PerformanceIndicator>
   </Computation>
  </WayToComputeQoS>
  </QosIndicator>
  <TriggerRule threshold="80"/>
 </SlaCriteriaPrototype>
 <ReportModels>
  <ReportPackage target="billing" dir="$ISMROOT/var/config/REPORT" name="rfc1604-bill.odc">
  </ReportPackage>
  <ReportPackage target="network" dir="$ISMROOT/var/config/REPORT" name="rfc1604-Net.odc">
  </ReportPackage>
 </ReportModels>
</SlaPackage>
```

ANNEX 6
Exemplary SLA Tool Description Model

This exemplary tool description model has been created for a service in Frame Relay technology, to support a piece of equipment called Router3000 from the manufacturer Cisco in accordance with the RFC 1604 standard.

```
<?xml version="1.0" encoding="ISO-8859-1"?>
<!DOCTYPE SlaToolsPackage SYSTEM "packageSlaTools.dtd">
<SlaToolsPackage version="1.0" serviceType="fr" manufacturer="Cisco" equipment="Router3000" equipmentVersion="1.0">
 <AgentData toolName="PMS">
  <Mib name="rfc1604" logicalName="rfc1604" oid="1.3.6.1.2.1.10.44"/>
  <File name="rfc1604Cisco.pck" dir="$ISMROOT/var/config/PMS" type="CollectFile"/>
  <File name="rfc1604Core.pck" dir="$ISMROOT/var/config/PMS" type="CollectFile"/>
 </AgentData>
 <AlarmData toolName="PMS">
  <File name="rfc1604Filter.conf" dir="$ISMROOT/var/config/Alarm" type="CopyFile"/>
  <File name="rfc1604Core.pck" dir="$ISMROOT/var/config/PMS" type="CollectFile"/>
  <File name="rfc1604.ALcfg" dir="$ISMROOT/var/config/Alarm" type="AlarmFilterFile"/>
 </AlarmData>
 <ConfigData toolName="Ip-Discovery">
   <File name="discovery.conf" dir="$ISMROOT/var/config/Ip-Discovery" type="CmisImportFile"/>
 </ConfigData>
 <ConfigData toolName="Ep">
```

-continued

```
<File name="taskCriteria1" dir="$ISMROOT/var/config/Ep"
type="CmisImportFile"/>
 </ConfigData>
</SlaToolsPackage>
```

The invention claimed is:

1. A method for monitoring a service that includes at least one technical component configured to support communications in accordance with at least one of a plurality of possible communications technologies, comprising:
producing, in a modeling language in object-oriented technology, a description of a service model structure according to a first grammar adapted to be used with each of the possible communication technologies;
constructing at least one service model from the description of said service model structure, said at least one service model being related to a specific one of the plurality of possible communication technologies;
constructing the service from the service model;
producing a description of a contract model structure using a second grammar, the contract model structure being used to construct at least one contract model;
producing a description of a collection tool model structure, wherein the description of the collection tool model is produced from a tool class designed to implement collection and comparison steps;
constructing at least one collection tool model from the description of the collection tool model structure, the at least one collection tool model being dependent on the service model and the contract model; and
monitoring the service thus constructed,
wherein the description of the service model structure allows the at least one service model to conform to the first grammar.

2. A method according to claim 1, wherein the description of the structure of the service model is produced from a service model class that includes at least one model related to at least said technical component and defined in EndPoints and Applications classes associated with said possible communication technologies.

3. A method according to claim 2, wherein said at least one technical component is described in a component type ComponentType class and further comprises implementing the method by a management system that includes a management information base (MIB) associated with a management information base module class representing at least one module of the base MIB.

4. A method according to claim 3, wherein the description of a component type in the ComponentType class also includes a management information base module attribute class that allows requests to access at least one attribute representing the component type in the base MIB.

5. A method according to claim 2, wherein the service model class also includes at least one parameter related to the service and defined in a parameter class optionally linked to a management information base (MIB) module attribute class when the method is implemented by a management system that includes a management information base.

6. A method according to claim 5, wherein the service model class also includes at least one request file to be installed, said request file being defined in a ExportedRequests class for obtaining at least one value related to at least said parameter defined by the parameter class, and optionally, obtaining at least one value of at least one parameter defined by the MIB module attribute class and at least one specific parameter of the component type defined by a ComponentType class.

7. A method according to claim 5, wherein the service model class also includes a management information base module for browsing said parameters and described in a ConfigurationMib class attached to the MIB module attribute class.

8. A method according to claim 2, wherein the service model class also includes an application defined in a File class for implementing the service, defined in an IntegratedAppli class and linked to at least one file for using the application to implement the service.

9. A method according to claim 1, wherein the service is a telecommunication service, and the at least the component includes a telecommunication connection.

10. A method for controlling the quality of a service that includes at least one technical component configured to support communications in accordance with at least one of a plurality of possible communications technologies, the quality of service being defined by a technical contract between a provider of the service and a customer, the contract including quality criteria associated with thresholds and related to at least one of said possible communication technologies, the method comprising:
producing a description, in a modeling language in object-oriented technology, of a service model structure;
producing a description, in a modeling language in object-oriented technology, of a contract model structure;
producing a description, in a modeling language in object-oriented technology, of a collection tool model structure, wherein the description of the collection tool model is produced from a tool class designed to implement-collection and comparison steps;
constructing at least one said service model, at least one said contract model, and at least one said collection tool model from the respective descriptions of said structures, wherein the description of the structure of the contract model uses a generic contract model grammar;
constructing the service, the contract, and the at least one collection tool from the service model, contract model, and collection tool model, respectively;
collecting quality of service indicators using said at least one collection tool; and
comparing the quality of service indicators with the thresholds defined in the contract,
wherein the description of the service model structure allows the at least one service model to conform to a first grammar adapted to be used with each of the possible communication technologies, and
the at least one collection tool model being dependent on the service model and the contract model.

11. A method according to claim 10, wherein the description of the structure of the contract model is produced from a criteria model SlaPackage class that includes at least one criteria prototype defined in a SlaCriteriaPrototype class according to said at least one communications technology, said SlaCriteriaPrototype class being associated with a QoS-Indicator class representing said quality of service indicators as well as at least one TriggerRule class representing at least one rule for triggering at least one action when a threshold is reached.

12. A method according to claim 11, wherein the QoS-Indicator class representing quality of service indicators includes a description defined in a Description class, at least one class PercentUnit, TimeUnit, ObjectUnit, ThroughputUnit representing a threshold unit and at least one WayToComputeQoS class representing at least one mode for computing said quality of service indicators.

13. A method according to claim 12, wherein the WayToComputeQoS class for computing said quality of service indicators is associated with at least one computation rule defined in a Computation class and optionally has at least one performance indicator contained in a PerformanceIndicator class that includes a description defined in said Description class, at least the threshold unit PercentUnit, TimeUnit, ObjectUnit, ThroughputUnit class and at least one WayToComputePerf class representing at least one mode for collecting a performance indicator.

14. A method according to claim 13, wherein, the performance indicator being basic, the collection mode defined by the WayToComputePerf class is applied to a theoretical measurement point defined by a TheoreticalMeasurementPoint class.

15. A method according to claim 13, wherein, the performance indicator being computed, the collection mode described in the WayToComputePerf class is represented by the computation rule Computation class, which optionally has as a parameter at least one other performance indicator contained in the PerformanceIndicator class.

16. A method according to claim 11, wherein the criteria model SlaPackage class also includes at least one set of quality of service control report models in a report model class.

17. A method according to claim 10, wherein the description of the structure of said at least one collection tool model is produced from a tool model SlaToolsPackage class that includes at least one AgentData, LogData, AlarmData, ApplData class representing a mode for collecting quality indicators and/or at least one description in a ConfigData class for configuring a computer application.

18. A method according to claim 10, wherein the description of the structure of the service model is produced from a service model class that includes at least one model related to at least said technical component and defined in EndPoints and Applications classes associated with at least one of said plurality of communications technologies.

19. A method according to claim 18, wherein at least said technical component is described in a component type ComponentType class and further comprises a management system for implementation of the method that includes a management information base associated with a management information base module class representing at least one module of the management information base.

20. A method according to claim 19, wherein the description of a component type in the ComponentType class also includes a management information base module attribute class that allows requests to access at least one attribute representing the component type in the management information base.

21. A method according to claim 18, wherein the service model class also includes at least one parameter related to the service and defined in a parameter class, optionally linked to a management information base module attribute class is upon implementation of the method by a management system that includes the management information base.

22. A method according to claim 21, wherein the service model class also includes at least one request file to be installed, said request file being defined in an ExportedRequests class for obtaining at least one value related to at least said parameter defined by the parameter class, and optionally, obtaining at least one value of at least one parameter defined by the management information base module attribute class and at least one specific parameter of the component type defined by a ComponentType class.

23. A method according to claim 21, wherein the service model class further includes a management information base module described in a ConfigurationMib class attached to the management information base module class for browsing said parameters.

24. A method according to claim 18, wherein the service model class also includes a third party application defined in a File class for implementing a service, defined in an IntegratedAppli class and linked to at least one file for using the application to implement the service.

25. A method according to claim 18, wherein the description of the structure of the contract model is produced from a criteria model SlaPackage class that includes at least one criteria prototype defined in a SlaCriteriaPrototype class according to one of said plurality of communications technologies, said SlaCriteriaPrototype class being associated with a QoSIndicator class representing said quality of service indicators as well as at least one TriggerRule class representing at least one rule for triggering at least one action when a threshold is reached.

26. A method according to claim 25, wherein the QoS-Indicator class representing quality indicators includes a description defined in a Description class, at least one class PercentUnit, TimeUnit, ObjectUnit, ThroughputUnit representing a threshold unit and at least one WayToComputeQoS class representing at least one mode for computing said quality of service indicators.

27. A method according to claim 26, wherein the WayToComputeQoS class for computing said quality of service indicators is associated with at least one computation rule defined in a Computation class and optionally has at least one performance indicator contained in a PerformanceIndicator class that includes a description defined in said Description class, at least the threshold unit PercentUnit, TimeUnit, ObjectUnit, ThroughputUnit class and at least one WayToComputePerf class representing at least one mode for collecting a performance indicator.

28. A method according to claim 27, wherein, the performance indicator being basic, the collection mode defined by the WayToComputePerf class is applied to a theoretical measurement point defined by a TheoreticalMeasurementPoint class.

29. A method according to claim 27, wherein, the performance indicator being computed, the collection mode described in the WayToComputePerf class is represented by the computation rule Computation class, which optionally has as a parameter at least one other performance indicator contained in the PerformanceIndicator class.

30. A method according to claim 25, wherein the criteria model SlaPackage class also includes at least one set of quality of service control report models in a report model class.

31. A method according to claim 18, wherein the description of the structure of said at least one collection tool model is produced from a tool model SlaToolsPackage class that includes at least one AgentData, LogData, AlarmData, ApplData class representing a mode for collecting quality indicators and/or at least one description in a ConfigData class for configuring a computer application.

32. A method according to claim 10, wherein the service is a telecommunication service, and the at least one technical component includes a telecommunication connection.

33. An information system comnrising:
at least one machine configured for managing and monitoring at least one resource using a service that includes at least one technical component configured to support communications in accordance with at least one of a plurality of communications technologies, including a plurality of quality indicators used to control the quality of service defined by a technical contract between a provider of the service and a customer, the contract including criteria associated with thresholds and related to at least one of said communications technologies;
wherein the at least one machine is further configured to produce, in a modeling language in object-oriented technology, a description of a service model structure according to a first grammar adapted to be used with each of the possible communication technologies;
wherein the at least one machine is further configured to produce a description of at least one contract model structure using a second grammar;
wherein the at least one machine is further configured to construct the service model from the service model structure description, the service model being related to a specific one of the plurality of possible communication technologies;
wherein the at least one machine is further configured to construct the contract model from the description of the at least one contract model structure;
wherein the at least one machine is further configured to produce a description of at least one collection tool model structure, wherein the description of the collection tool model is produced from a tool class designed to implement collection and comparison steps;
the at least one collection tool model being dependent on the service model and the contract model;
wherein the at least one machine is further configured to monitor the service thus constructed; and
wherein the description of the service model structure allows the at least one service model to conform to the first grammar.

34. A computer readable medium encoded with programmed instructions which, when executed by a processor, cause the processor to implement a method which monitors a service that includes at least one technical component configured to support communications in accordance with at least one of a plurality of communications technologies, the method comprising:
producing, in a modeling language in object-oriented technology, a description of a service model structure according to a first grammar adapted to be used with each of the possible communication technologies; constructing the at least one service model from the description of said service model structure;
defining a contract model structure using a second generic model grammar;
constructing a contract model from the definition of the at least one contract model structure;
constructing the service from the service model;
producing a description of at least one collection tool model structure, wherein the description of the collection tool model is produced from a tool class designed to implement collection and comparison steps;
constructing at least one collection tool model from the description of the collection tool model structure, the at least one collection tool model being dependent on the service model and the contract model; and
monitoring the service thus constructed,
wherein the description of the service model structure makes it possible to define the at least one service model according to the first grammar.

35. A computer readable medium encoded with programmed instructions which, when executed by a processor, cause the processor to execute a method which monitors a service that includes at least one technical component configured to support communications in accordance with at least one of a plurality of communications technologies, the method comprising:
producing, in a modeling language in object-oriented technology, a description of a service model structure according to a first grammar adapted to be used with each of the possible communication technologies;
constructing the service model from the description of said service model structure;
constructing the service from the service model;
producing a description of a contract model structure using a second grammar;
constructing a contract model from the definition of the at least one contract model structure;
producing a description of at least one collection tool model structure, wherein the description of the collection tool model is produced from a tool class designed to implement collection and comparison steps;
constructing at least one collection tool model from the description of the collection tool model structure, the at least one collection tool model being dependent on the service model and the contract model; and
monitoring the service thus constructed,
wherein the description makes it possible to define the at least one service model according to the first grammar.

36. A computer readable medium encoded with programmed instructions which, when executed by a processor, cause a processor to perform a method which controls the quality of a service comprising:
producing a description of a structure of a ServicePackage service model produced from a service model class that includes at least one model related to at least a technical component and defined in EndPoints and Applications classes according to one of a plurality of communications technologies, the description of the structure making it possible to define at least one service model according to a first grammar adapted to be used with each of the possible communication technologies;
producing a description of a contract model according to a second generic grammar,
generating the contract model based on the definition of the at least one contract model structure,
producing a description of at least one collection tool model, and
generating at least one collection tool model from the description of the collection tool model structure, the at least one collection tool model being dependent on the service model and the contract model.

37. A computer readable medium encoded with programmed instructions which, when executed by a processor, cause the processor to control a quality of a service that includes at least one technical component configured to support communications in accordance with at least one of a plurality of communications technologies, the quality of service being defined by a technical contract between a provider of the service and a customer, the contract including quality criteria associated with thresholds and related to said at least one communications technology, the method comprising:

producing, in a modeling language in object-oriented technology, a description of a service model structure according to a first grammar adapted to be used with each of the possible communication technologies;

producing a description of a contract model structure and a description of a collection tool model structure, wherein the description of the contract model structure is produced using a second grammar;

constructing the service model, the contract model, and the at least one collection tool model from the respective descriptions of said structures;

constructing the service, the contract, and the at least one collection tool from the service model, contract model, and collection tool model;

collecting quality of service indicators using the at least said one collection tool; and comparing the quality of service indicators with the thresholds defined in the contract, wherein the description of the service model structure allows the at least one service model to conform to the first grammar, wherein the description of the collection tool model is produced from a tool class designed to implement collection and comparison steps; and the at least one collection tool model is dependent on the service model and the contract model.

* * * * *